(12) United States Patent
Kishida et al.

(10) Patent No.: US 12,713,340 B2
(45) Date of Patent: Aug. 18, 2026

(54) BASE STATION AND TERMINAL APPARATUS FOR COMMUNICATING INFORMATION DURING MULTI-LINK POWER SAVING

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 459 days.

(21) Appl. No.: 18/017,958

(22) PCT Filed: Jul. 27, 2020

(86) PCT No.: PCT/JP2020/028678
§ 371 (c)(1),
(2) Date: Jan. 25, 2023

(87) PCT Pub. No.: WO2022/024176
PCT Pub. Date: Feb. 3, 2022

(65) Prior Publication Data

US 2023/0354186 A1 Nov. 2, 2023

(51) Int. Cl.
*H04W 52/02* (2009.01)

(52) U.S. Cl.
CPC ... *H04W 52/0206* (2013.01); *H04W 52/0212* (2013.01)

(58) Field of Classification Search
CPC ......... H04W 52/0206; H04W 52/0212; H04W 52/0216; H04W 52/0219; H04W 76/27; H04W 76/15; H04W 84/00; Y02D 30/70
See application file for complete search history.

(56) References Cited

U.S. PATENT DOCUMENTS 10,609,647 B2 * 3/2020 Cariou .................... H04L 5/001
2019/0335454 A1 10/2019 Huang et al.
(Continued)

FOREIGN PATENT DOCUMENTS

JP 2010-50694 A 3/2010
JP 2016-197908 A 11/2016
(Continued)

OTHER PUBLICATIONS

IEEE Std 802.Nov. 2016, "9.3.3.3 Beacon frame format" and "11.1 Synchronization", Dec. 7, 2016.
(Continued)

*Primary Examiner* — Robert C Scheibel
(74) *Attorney, Agent, or Firm* — Harness, Dickey & Pierce, PLC

(57) ABSTRACT

According to an embodiment, a base station includes first and second wireless signal processing units and a link management unit. The first and second wireless signal processing units transmit and receive a wireless signal using first and second channels, respectively. The link management unit sets a multi-link to a first or second state. In the first state, a first link in which the first wireless signal processing unit is used and a second link in which the second wireless signal processing unit is used are each in an active mode in which communication is possible. In the second state, the first link is in the active mode or an intermittent operation mode in which an operation is intermittent, and the second link is an operation pause mode in which power consumption is less than in the intermittent operation mode.

4 Claims, 22 Drawing Sheets

(56) References Cited

U.S. PATENT DOCUMENTS

| | | | | |
|---|---|---|---|---|
| 2020/0077441 | A1 | 3/2020 | Madhavan et al. | |
| 2020/0120603 | A1 | 4/2020 | Seok et al. | |
| 2020/0137683 | A1 | 4/2020 | Cariou et al. | |
| 2021/0385006 | A1 | 12/2021 | Ryu et al. | |
| 2022/0394556 | A1* | 12/2022 | Li | H04L 5/0037 |
| 2023/0083599 | A1* | 3/2023 | Kim | H04W 52/0216<br>370/311 |
| 2023/0224814 | A1* | 7/2023 | Kim | H04W 52/0216<br>370/311 |
| 2023/0232276 | A1* | 7/2023 | Chitrakar | H04W 28/0278 |

FOREIGN PATENT DOCUMENTS

| | | | |
|---|---|---|---|
| WO | WO-2011112000 | A2 | 9/2011 |
| WO | WO-2020085824 | A1 | 4/2020 |
| WO | 2021/251901 | A1 | 12/2021 |

OTHER PUBLICATIONS

International Search Report of the ISA (English and Japanese) issued in PCT/JP2020/028678, mailed Sep. 8, 2020; ISA/JP.
Yang, Jay et al. "MLD AP Power-saving (PS) Considerations", Doc.: IEEE 802.11-20/1115r0, Jul. 2020.
Kim, Namyeong et al. "Power saving considering non-AP MLD without STR capability", doc.: IEEE 802.11-20/0037r2, Jan. 13, 2020.
Cariou, Laurent et al., "Multi-link: steps for using a link", IEEE 802.11-19/1924rl, Nov. 16, 2019.
Seok, Yongho et al., "Multi-Link Operation Management", IEEE 802.11-19/1358r0, Sep. 14, 2019.

* cited by examiner

Fig. 9

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | ○ (ANCHOR) | #1,#2 |
| STA2 (LINK #2) | 5GHz | CH2 | XX | ○ | #1,#3 |
| STA3 (LINK #3) | 2.4GHz | CH2 | XX | ○ | #4 |

Fig. 12

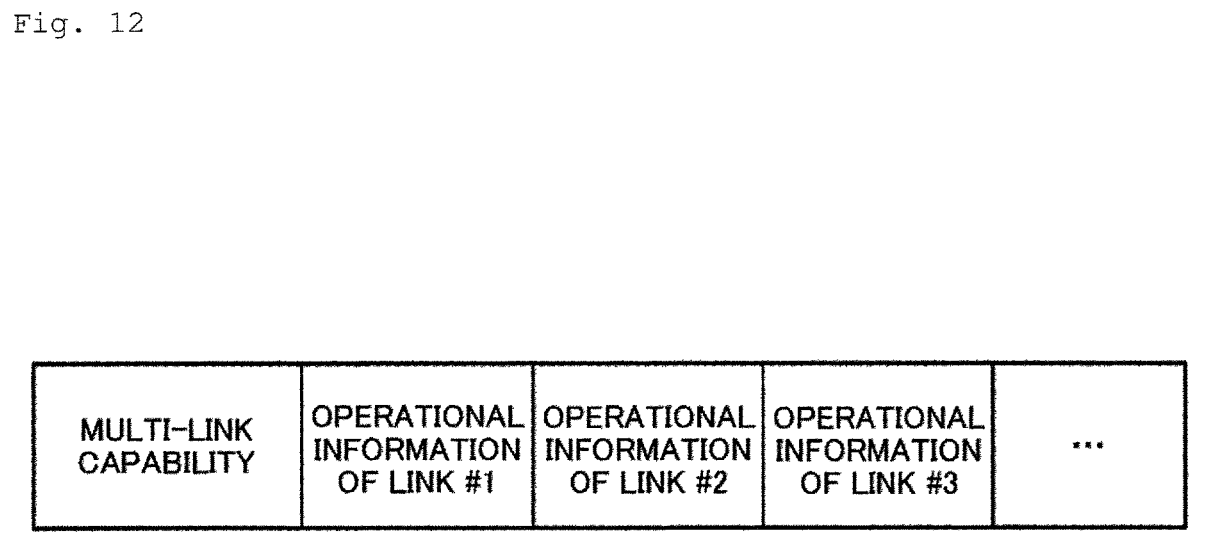

| MULTI-LINK CAPABILITY | OPERATIONAL INFORMATION OF LINK #1 | OPERATIONAL INFORMATION OF LINK #2 | OPERATIONAL INFORMATION OF LINK #3 | ... |
|---|---|---|---|---|

Fig. 14

| STA FUNCTION | FREQUENCY BAND | CHANNEL ID | OPERATION MODE | LINK DESTINATION ID | MULTI-LINK | TID |
|---|---|---|---|---|---|---|
| STA1 (LINK #1) | 6GHz | CH1 | ACTIVE | XX | ○ (ANCHOR) | #1,#2 |
| STA2 (LINK #2) | 5GHz | CH2 | ACTIVE | XX | ○ | #1,#3 |
| STA3 (LINK #3) | 2.4GHz | CH2 | ACTIVE | XX | ○ | #4 |

| STA FUNCTION | FREQUENCY BAND | CHANNEL ID | OPERATION MODE | LINK DESTINATION ID | MULTI-LINK | TID |
|---|---|---|---|---|---|---|
| STA1 (LINK #1) | 6GHz | CH1 | INTERMITTENT OPERATION | XX | ○ (ANCHOR) | #1,#2 |
| STA2 (LINK #2) | 5GHz | CH2 | OPERATION PAUSE | XX | ○ | #1,#3 |
| STA3 (LINK #3) | 2.4GHz | CH2 | OPERATION PAUSE | XX | ○ | #4 |

Fig. 16

| TERMINAL APPARATUS IDENTIFIER (AID) | PVB OF TID #1 | PVB OF TID #2 | PVB OF TID #3 | PVB OF TID #4 | ... |
|---|---|---|---|---|---|

BASE STATION AND TERMINAL APPARATUS FOR COMMUNICATING INFORMATION DURING MULTI-LINK POWER SAVING

CROSS-REFERENCE TO RELATED APPLICATIONS

This application is a 371 U.S. National Phase of International Application No. PCT/JP2020/028678, filed on Jul. 27, 2020. The entire disclosure of the above application is incorporated herein by reference.

TECHNICAL FIELD

Embodiments relate to a base station and a terminal apparatus.

BACKGROUND ART

A wireless local area network (LAN) is known as a wireless system wirelessly connecting a base station and a terminal apparatus.

CITATION LIST

Non Patent Literature

NPL 1: IEEE Std 802.11-2016, "9.3.3.3 Beacon Frame Format" and "11.1 Synchronization," 7 Dec. 2016

SUMMARY OF INVENTION

Technical Problem

An objective is to reduce power consumption of a wireless terminal apparatus.

Means for Solution to Problem

According to an embodiment, a base station includes first and second wireless signal processing units and a link management unit. The first wireless signal processing unit is configured to be able to transmit and receive a wireless signal using a first channel. The second wireless signal processing unit is configured to be able to transmit and receive a wireless signal using a second channel different from the first channel. The link management unit establishes a multi-link with a terminal apparatus using the first and second wireless signal processing units. The link management unit sets the multi-link to a first or second state. In the first state, a first link in which the first wireless signal processing unit is used and a second link in which the second wireless signal processing unit is used are each in an active mode in which communication is possible. In the second state, the first link is in the active mode or an intermittent operation mode in which an operation is intermittent, and the second link is an operation pause mode in which power consumption is less than in the intermittent operation mode.

Advantageous Effects of Invention

A base station according to the embodiment can reduce power consumption of a wireless terminal apparatus.

BRIEF DESCRIPTION OF DRAWINGS

FIG. 9 is a table illustrating an example of link management information in the wireless system according to the embodiment.

FIG. 12 is a conceptual diagram illustrating an example of a beacon signal including multi-link capability information in the wireless system according to the embodiment.

FIG. 14 is a table illustrating an example of a change in the link management information during application of multi-link power saving in the wireless system according to the embodiment.

FIG. 16 is a conceptual diagram illustrating an example of a beacon signal including a partial virtual bitmap (PVB) in the wireless system according to the embodiment.

DESCRIPTION OF EMBODIMENTS

Figure 1:
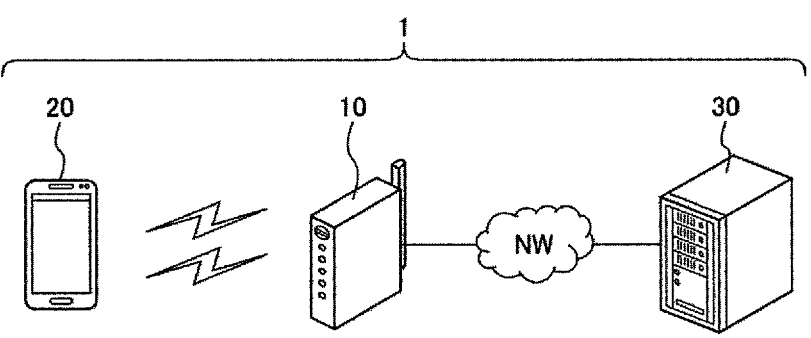
FIG. 1 is a conceptual diagram illustrating an example of an overall configuration of a wireless system according to an embodiment.

Hereinafter, a wireless system 1 according to an embodiment will be described with reference to the drawings. In the embodiment, a device or a method for embodying the technical idea of the invention will be exemplified. The drawings are schematic or conceptual. The dimensions, the ratios, and the like of the drawings are not necessarily the same as the actual ones. The technical idea of the present invention is not specified in accordance with the shapes, structures, disposition, and the like of constituent elements. In the following description, the same reference numerals are given to components having substantially the same function and configuration.

<1> Configuration of Wireless System 1

<1-1> Overall Configuration of Wireless System 1

FIG. 1 illustrates an example of a configuration of the wireless system 1 according to the embodiment. As illustrated in FIG. 1, the wireless system 1 includes, for example, a base station 10, a terminal apparatus 20, and a server 30.

The base station 10 is connected to a network NW and is used as an access point of a wireless LAN. For example, the base station 10 can deliver data received from the network NW to the terminal apparatus 20 wirelessly. The base station 10 can be connected to the terminal apparatus 20 using one type of band or a plurality of types of bands. In the present specification, wireless connection in which a plurality of types of bands are used between the base station 10 and the terminal apparatus 20 is referred to as a "multi-link." Communication between the base station 10 and the terminal apparatus 20 is based on, for example, the standard of IEEE 802.11.11.

The terminal apparatus 20 is, for example, a wireless terminal apparatus such as a smartphone or a tablet PC. The terminal apparatus 20 can transmit and receive data to and from a server 30 on the network NW via the wirelessly connected base station 10. The terminal apparatus 20 may be another electronic device such as a desktop computer or a laptop computer. The terminal apparatus 20 may be a device that can communicate with at least the base station 10 and can perform an operation to be described below.

The server 30 can retain various types of information and retains, for example, data of content for the terminal apparatus 20. The server 30 is connected to, for example, the network NW in a wired manner and is able to communicate with the base station 10 via the network NW. The server 30 may be able to communicate with at least the base station 10. That is, communication between the base station 10 and the server 30 may be wired or wireless communication.

In the wireless system 1 according to the embodiment, data communication between the base station 10 and the terminal apparatus 20 is based on the open systems interconnection (OSI) reference model. In the OSI reference model, communication functions are divided into seven layers (Layer 1: the physical layer, Layer 2: the data link layer, Layer 3: the network layer, Layer 4: the transport layer, Layer 5: the session layer, Layer 6: the presentation layer, and Layer 7: the application layer).

The data link layer includes, for example, a logical link control (LLC) layer and a media access control (MAC) layer. In the LLC layer, a destination service access point (DSAP) header and a source service access point (SSAP) header or the like are added to data input from a higher-order application, for example, to form an LLC packet. In the MAC layer, a MAC header is added to the LLC packet, for example, to form a MAC frame.

(Frequency Bands Used for Wireless Communication)

Figure 2:
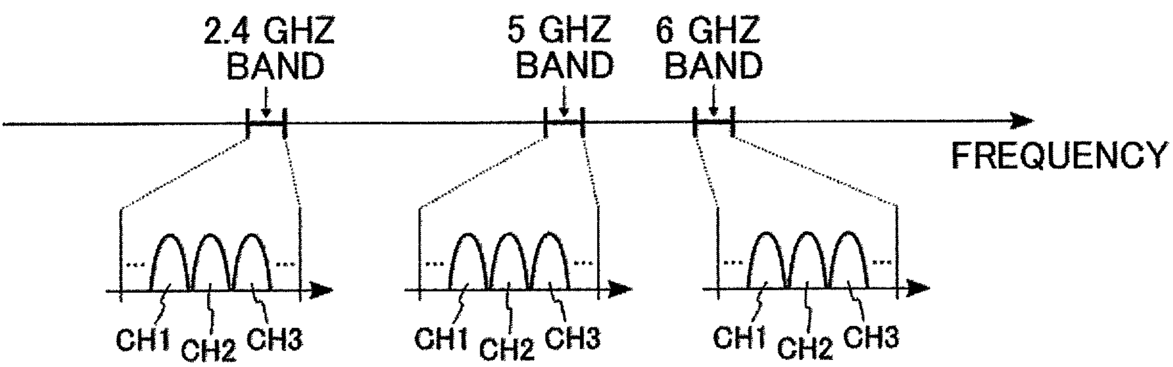
FIG. 2 is a conceptual diagram illustrating examples of frequency bands used for wireless communication in the wireless system according to the embodiment.

FIG. 2 illustrates examples of frequency bands used for wireless communication in the wireless system 1 according to the embodiment. As illustrated in FIG. 2, in wireless communication, for example, a 2.4 GHz band, a 5 GHz band, and a 6 GHz band are used. Each frequency band includes a plurality of channels. In this example, each of the 2.4 GHz band, the 5 GHz band, and the 6 GHz band includes at least the three channels CH1, CH2, and CH3. Communication in which each channel CH is used is realized by an STA function to be described below.

The wireless system 1 may use frequency bands other than the 4 GHz band, 5 GHz band and 6 GHz band for wireless communication. At least one channel CH may be set in each frequency band. In the multi-link, the channels CH of the same frequency band may be used, or the channels CH of different frequency bands may be used.

(Format of Wireless Frame)

Figure 3:
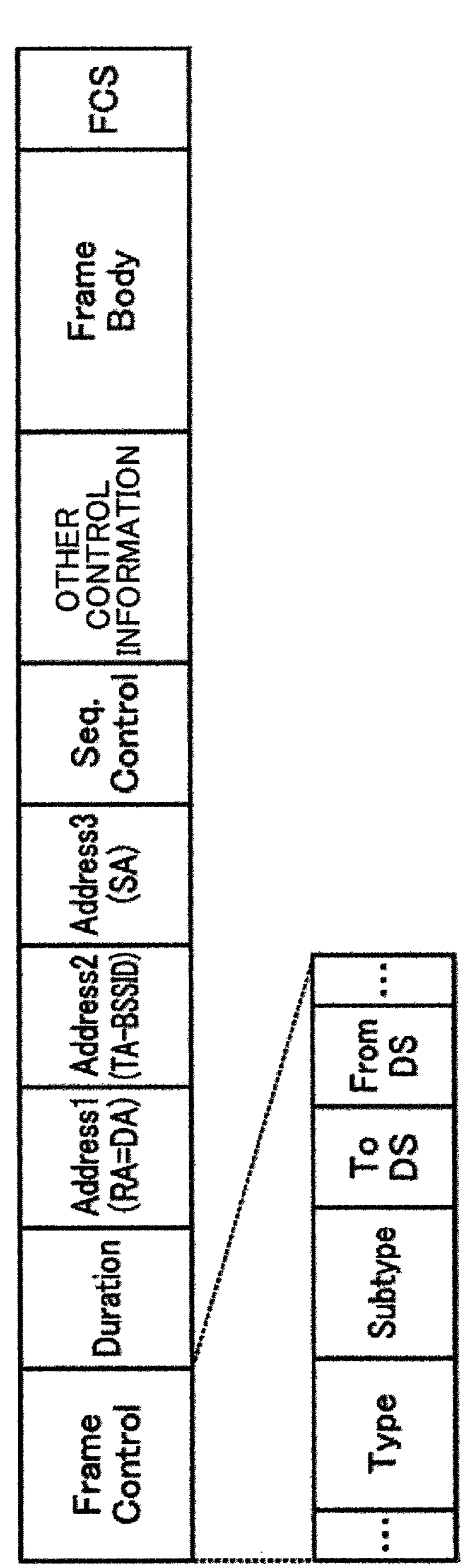
FIG. 3 is a conceptual diagram illustrating an example of the format of a wireless frame in the wireless system according to the embodiment.

FIG. 3 illustrates a specific example of a format of a wireless frame used for communication between the base station 10 and the terminal apparatus 20 in the wireless system 1 according to the embodiment. As illustrated in FIG. 3, the wireless frame includes, for example, a frame control field, a duration field, an Address1 field, an Address2 field, an Address3 field, a sequence control field, an other-control information field, a frame body field, and a frame check sequence (FCS) field.

The frame control field to the other-control information field correspond to, for example, a MAC header included in a MAC frame. The frame body field corresponds to, for example, a MAC payload included in the MAC frame. The FCS field stores the error detection code of the MAC header and the frame body field and is used to determine whether there is an error in the wireless frame.

The frame control field indicates various types of control information and includes, for example, a type value, a subtype value, a To distribution system (To DS) value, and a From DS value. The type value indicates a frame type of the wireless frame. For example, the type value "00" indicates that the wireless frame is a management frame. The type value "01" indicates that the wireless frame is a control frame. The type value "10" indicates that the wireless frame is a data frame.

Content of the wireless frame is changed in accordance with a combination of the type value and the subtype value. For example, "00/1000 (type value/subtype value)" indicates that the wireless frame is a beacon signal. The meaning of the To DS value and the From DS value differs in its combination. For example, "00 (To DS/From DS)" indicates data between terminal apparatuses in the same independent basic service set (IBSS). "10" indicates that a data frame is directed from the outside to the distribution system (DS). "01" indicates that a data frame is directed to the outside of the DS. "11" is used when a mesh network is configured.

The duration field indicates a scheduled period in which a wireless line is used. The plurality of address fields indicate a BSSID, a transmission source address, a destination address, a transmitter terminal apparatus address, and a receiver terminal apparatus address. The sequence control field indicates a sequence number of a MAC frame and a fragment number for a fragment. The other-control information field includes, for example, type of traffic (TID) information. The TID information may be inserted at another position in the wireless frame. The frame body field includes information in accordance with a type of frame. For example, when the frame body field corresponds to a data frame, data is stored.

<1-2> Configuration of Base Station 10

Figure 4:
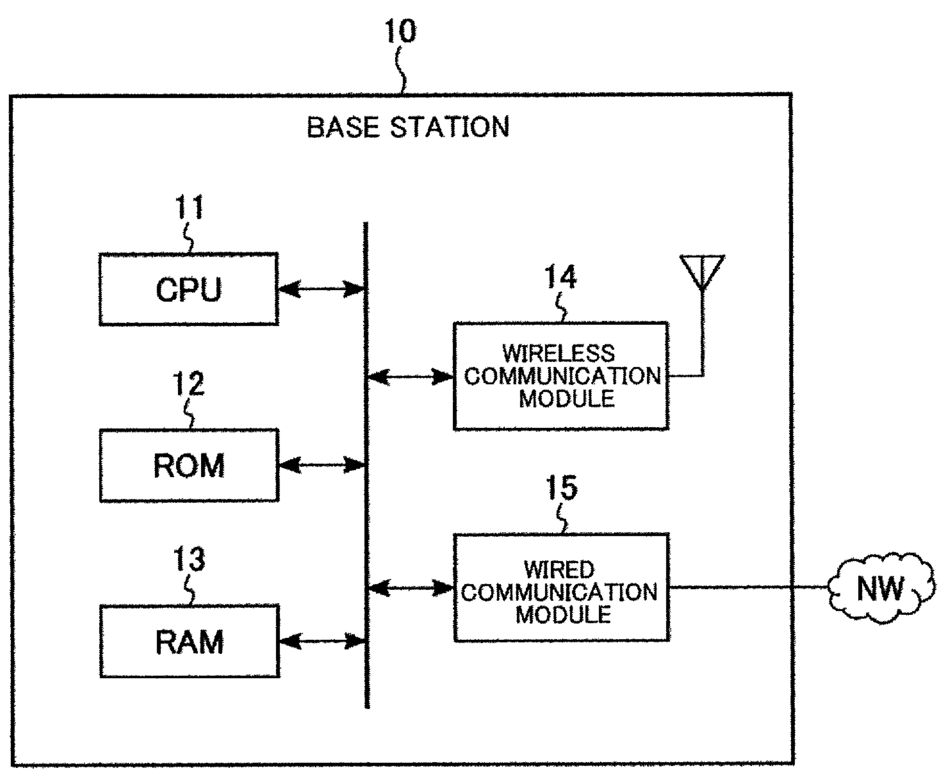
FIG. 4 is a block diagram illustrating an example of a configuration of a base station included in the wireless system according to the embodiment.

FIG. 4 illustrates an example of a configuration of the base station 10 included in the wireless system 1 according to the embodiment. As illustrated in FIG. 4, the base station 10 includes, for example, a central processing unit (CPU) 11, a read-only memory (ROM) 12, a random access memory (RAM) 13, a wireless communication module 14, and a wired communication module 15.

The CPU 11 is a circuit that can execute various programs, and controls an operation of the whole base station 10. The ROM 12 is a nonvolatile semiconductor memory and retains a program, control data, and the like for controlling the base station 10. The RAM 13 is, for example, a volatile semiconductor memory and is used as a working area of the CPU 11. The wireless communication module 14 is a circuit used to transmit and receive data using a wireless signal and is connected to an antenna. The wireless communication module 14 includes, for example, a plurality of communication modules respectively corresponding to a plurality of frequency bands. The wired communication module 15 is a circuit used to transmit and receive data using a wired signal and is connected to the network NW.

Figure 5:
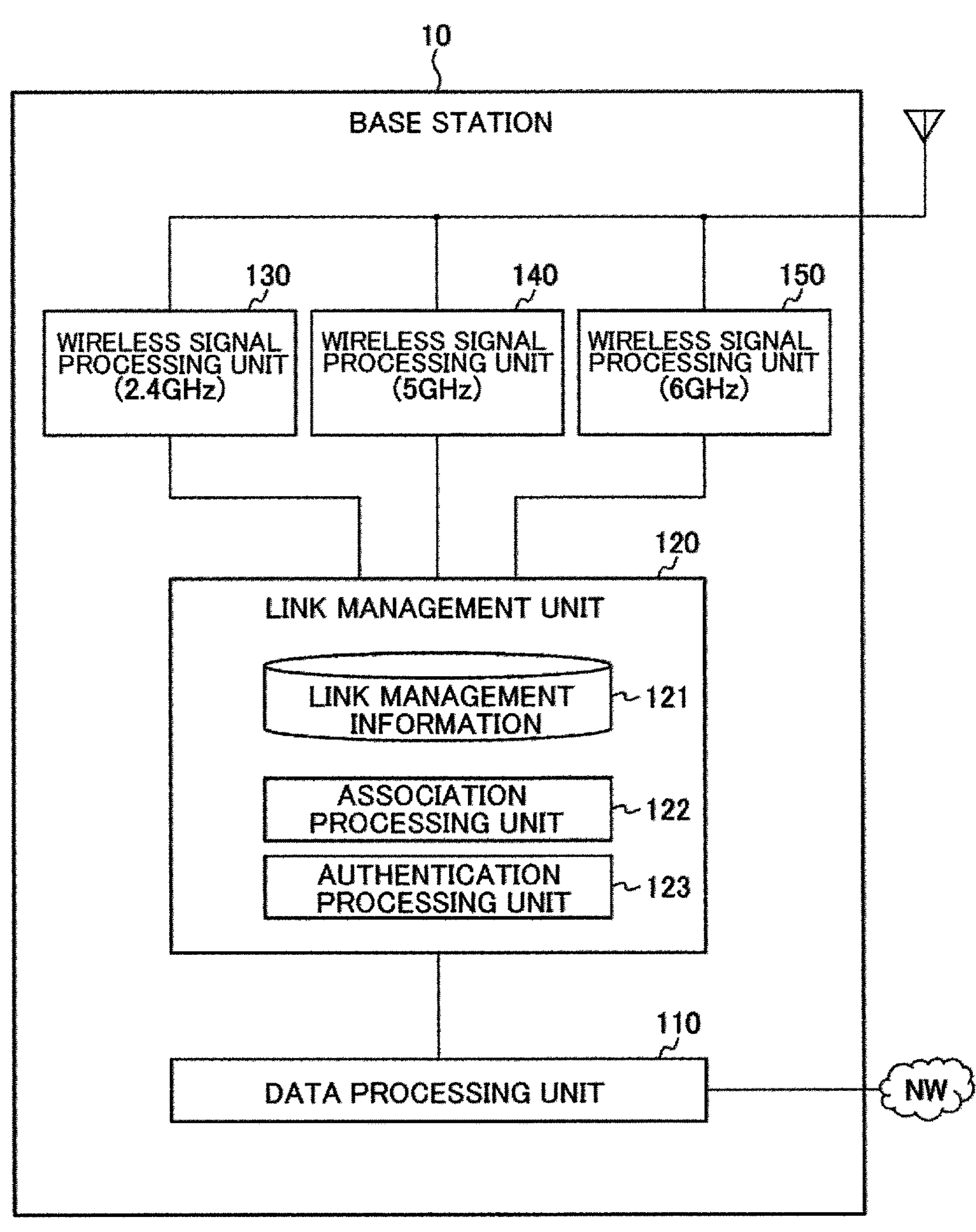
FIG. 5 is a block diagram illustrating an example of a function of the base station included in the wireless system according to the embodiment.

FIG. 5 illustrates an example of a functional configuration of the base station 10 included in the wireless system 1 according to the embodiment. As illustrated in FIG. 5, the base station 10 includes as, for example, a data processing unit 110, a link management unit 120, and wireless signal processing units 130, 140, and 150. Processing of the data processing unit 110, the link management unit 120, and the wireless signal processing units 130, 140, and 150 is realized by, for example, the CPU 11 and the wireless communication module 14.

The data processing unit 110 can perform the processing of the LLC layer and the processing of the higher layers (the third to seventh layers) on input data. For example, the data processing unit 110 outputs data input from the server 30 via the network NW to the link management unit 120. The data processing unit 110 transmits the data input from the link management unit 120 to the server 30 via the network NW.

The link management unit 120 performs, for example, some of the processing of the MAC layer on the input data. The link management unit 120 manages link with the terminal apparatus 20 based on notifications from the wireless signal processing units 130, 140, and 150. The link management unit 120 includes link management information 121. The link management information 121 is stored in, for example, the RAM 13, and includes information regarding the terminal apparatus 20 wirelessly connected to the base station 10. The link management unit 120 includes an association processing unit 122 and an authentication processing unit 123. When the association processing unit 122 receives a connection request from the terminal apparatus 20 via one of the wireless signal processing units 130, 140, and 150, the association processing unit 122 executes a protocol related to the association. The authentication processing unit 123 executes a protocol related to authentication in succession to the connection request.

Each of the wireless signal processing units 130, 140, and 150 transmits and receives data to and from the base station 10 and the terminal apparatus 20 through wireless communication. For example, each of the wireless signal processing units 130, 140, and 150 adds a preamble or a PHY header, or the like to data input from the link management unit 120 to generate a wireless frame. Then, each of the wireless signal processing units 130, 140, and 150 converts the wireless frame into a wireless signal and delivers the wireless signal via the antenna of the base station 10. Each of the wireless signal processing units 130, 140, and 150 converts the wireless signal received via the antenna of the base station 10 into a wireless frame. Each of the wireless signal processing units 130, 140, and 150 outputs the data included in the wireless frame to the link management unit 120.

In this way, each of the wireless signal processing units 130, 140, and 150 can perform, for example, some of the processing of the MAC layer and the processing of the first layer on the input data or the wireless signal. For example, the wireless signal processing unit 130 handles a wireless signal of the 2.4 GHz band. The wireless signal processing unit 140 handles a wireless signal of the 5 GHz band. The wireless signal processing unit 150 handles a wireless signal of the 6 GHz band. The wireless signal processing units 130, 140, and 150 may or may not share the antenna of the base station 10.

<1-3> Configuration of Terminal Apparatus 20

Figure 6:
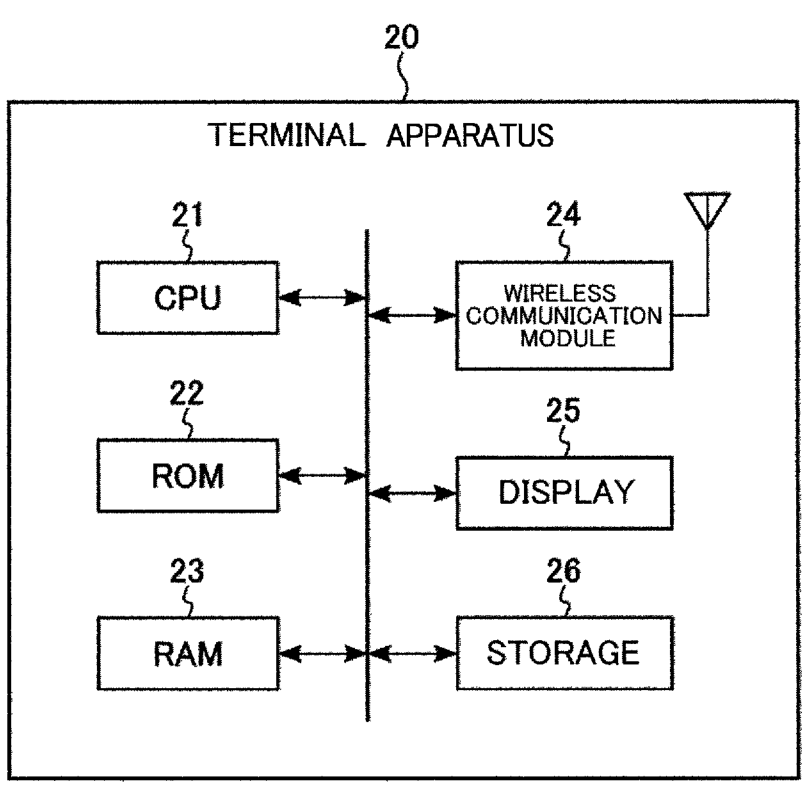
FIG. 6 is a block diagram illustrating an example of a configuration of a terminal apparatus included in the wireless system according to the embodiment.

FIG. 6 illustrates an example of a configuration of the terminal apparatus 20 included in the wireless system 1 according to the embodiment. As illustrated in FIG. 6, the terminal apparatus 20 includes, for example, a CPU 21, a ROM 22, a RAM 23, a wireless communication module 24, a display 25, and a storage 26.

The CPU 21 is a circuit that can execute various programs, and controls the overall operation of the terminal apparatus 20. The ROM 22 is a nonvolatile semiconductor memory, and retains a program, control data, and the like for controlling the terminal apparatus 20. The RAM 23 is, for example, a volatile semiconductor memory and is used as a working area of the CPU 21. The wireless communication module 24 is a circuit used to transmit and receive data by a wireless signal, and is connected to an antenna. The wireless communication module 24 includes, for example, a plurality of communication modules respectively corresponding to a plurality of frequency bands. The display 25 displays, for example, a graphical user interface (GUI) corresponding to application software. The display 25 may have a function of an input interface of the terminal apparatus 20. The storage 26 is a nonvolatile storage device and retains, for example, system software or the like of the terminal apparatus 20. The terminal apparatus 20 may not include a display. For example, the display 25 can be omitted for the IoT terminal apparatus.

Figure 7:
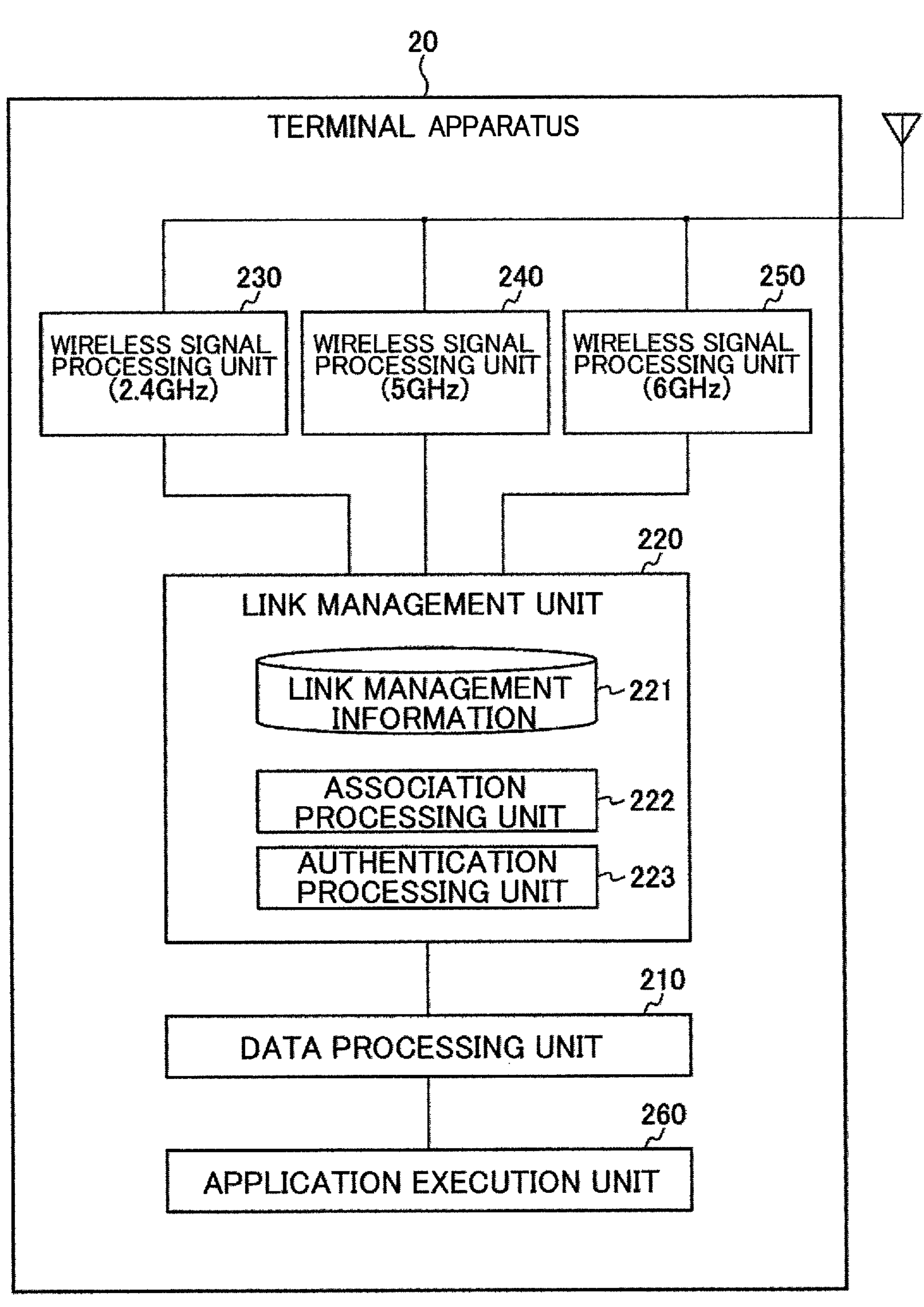
FIG. 7 is a block diagram illustrating an example of a function of a terminal apparatus included in the wireless system according to the embodiment.

FIG. 7 illustrates an example of a functional configuration of the terminal apparatus 20 included in the wireless system 1 according to the embodiment. As illustrated in FIG. 7, the terminal apparatus 20 includes, for example, a data processing unit 210, a link management unit 220, wireless signal processing units 230, 240, and 250, and an application execution unit 260. The processing of the data processing unit 210, the link management unit 220, and the wireless signal processing units 230, 240, and 250 is realized by, for example, the CPU 21 and the wireless communication module 24.

The data processing unit 210 can perform the processing of the LLC layer and the processing of the higher layers (the third to seventh layers) on the input data. For example, the data processing unit 210 outputs the data input from the application execution unit 260 to the link management unit 220. The data processing unit 210 outputs the data input from the link management unit 220 to the application execution unit 260.

The link management unit 220 can perform, for example, some of the processing of the MAC layer on the input data.

The link management unit 220 manages link with the base station 10 based on notifications from the wireless signal processing units 230, 240, and 250. The link management unit 220 includes link management information 221. The link management information 221 is stored in, for example, the RAM 23 and includes information regarding the base station 10 wirelessly connected to the terminal apparatus 20. The link management unit 220 includes an association processing unit 222 and an authentication processing unit 223. When the association processing unit 222 receives a connection request from the base station 10 via one of the wireless signal processing units 230, 240, and 250, the association processing unit 222 executes a protocol related to association. The authentication processing unit 223 executes a protocol related to authentication in succession to the connection request.

Each of the wireless signal processing units 230, 240, and 250 transmits and receives data to and from the base station 10 and the terminal apparatus 20 through wireless communication. For example, each of the wireless signal processing units 230, 240, and 250 adds a preamble, a PHY header, or the like to the data input from the link management unit 220 to generate a wireless frame. Then, each of the wireless signal processing units 230, 240, and 250 converts the wireless frame into a wireless signal and delivers the wireless signal via the antenna of the terminal apparatus 20. Each of the wireless signal processing units 230, 240, and 250 converts the wireless signal received via the antenna of the terminal apparatus 20 into a wireless frame. Each of the wireless signal processing units 230, 240, and 250 outputs the data included in the wireless frame to the link management unit 220.

In this way, each of the wireless signal processing units 230, 240, and 250 can execute, for example, some of the processing of the MAC layer and the processing of the first layer on the input data or the wireless signal. For example, the wireless signal processing unit 230 handles a wireless signal of the 2.4 GHz band. The wireless signal processing unit 240 handles a wireless signal of the 5 GHz band. The wireless signal processing unit 250 handles a wireless signal of the 6 GHz band. The wireless signal processing units 230, 240, and 250 may or may not share the antenna of the terminal apparatus 20.

The application execution unit 260 executes an application that can use the data input from the data processing unit 210. For example, the application execution unit 260 can display information regarding the application on the display 25. The application execution unit 260 can operate based on a manipulation of the input interface.

In the wireless system 1 according to the embodiment described above, the wireless signal processing units 130, 140, and 150 of the base station 10 can be connected to the wireless signal processing units 230, 240, and 250 of the terminal apparatus 20, respectively. That is, the wireless signal processing units 130 and 230 can be connected wirelessly using 2 4 GHz band. The wireless signal processing units 140 and 240 can be connected wirelessly using the 5 GHz band. The wireless signal processing units 150 and 250 can be connected wirelessly using the 6 GHz band. In the present specification, each wireless signal processing unit may be referred to as an "STA function". That is, the wireless system 1 according to the embodiment has a plurality of STA functions.

<1-4> Link Management Unit 120

Figure 8:
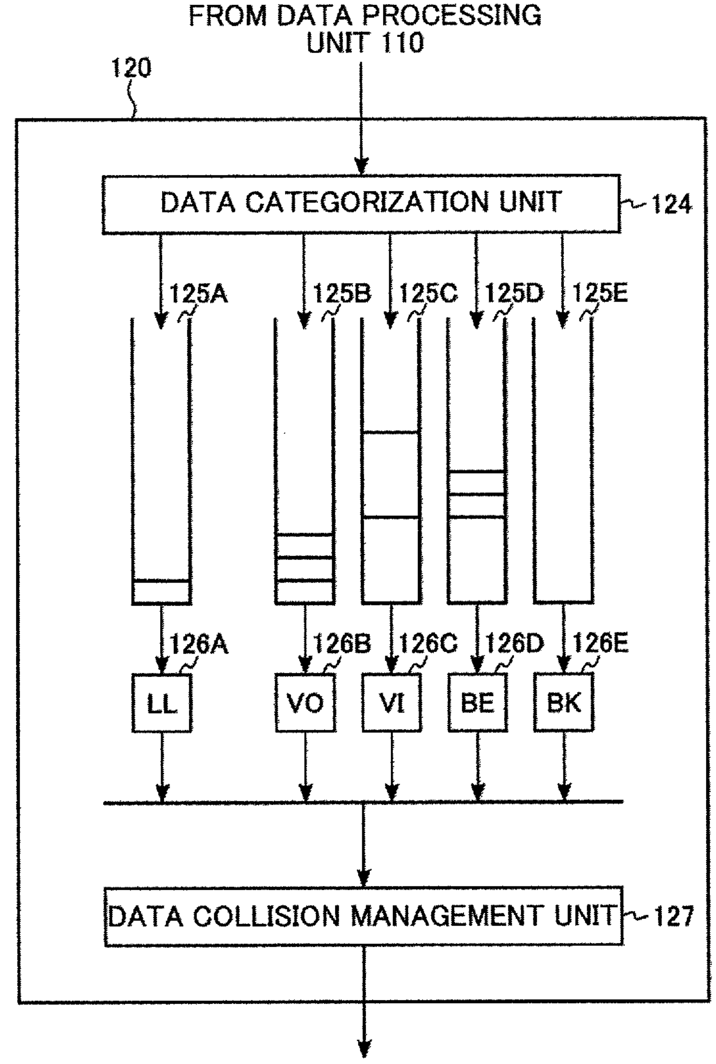
FIG. 8 is a block diagram illustrating an example of a detailed function of a link management unit of the base station included in the wireless system according to the embodiment.

FIG. 8 illustrates the details of a channel access function in the link management unit 120 of the base station 10 included in the wireless system 1 according to the embodiment. Since the function of the link management unit 220 of the terminal apparatus 20 is the same as that of, for example, the link management unit 120 of the base station 10, the description thereof will be omitted. As illustrated in FIG. 8, the link management unit 120 includes, for example, a data categorizing unit 124, transmission queues 125A, 125B, 125C, 125D and 125E, carrier sense multiple access with collision avoidance (CSMA/CA) execution units 126A, 126B, 126C, 126D and 126E, and a data collision management unit 127.

The data categorizing unit 124 categorizes the data input from the data processing unit 110. As the category of data, for example, low latency (LL)." "voice (VO)," "video (VI), "beast effort (BE)," and "background (BK)." The LL is applied to data for which low delay is required. Therefore, LL data is preferably processed preferentially to any of VO, VI, be and BK data.

The data categorizing unit 124 inputs the categorized data to one of the transmission queues 125A, 125B, 125C, 125D and 125E. Specifically, the LL data is inputted to the transmission queue 125A. The VO data is inputted to the transmission queue 125B. The VI data is inputted to the transmission queue 125C. The BE data is inputted to the transmission queue 125D. The BK data is inputted to the transmission queue 125E. Then, the inputted data of each category is stored in one of the corresponding transmission queues 125A to 125E.

Each of the CSMA/CA execution units 126A, 126B, 126C, 126D and 126E wait for transmission for an amount of time defined by a preset access parameter, while checking that no wireless signal is transmitted from other terminal apparatuses or the like by carrier sensing in CSMA/CA. Then, the CSMA/CA execution units 126A, 126B, 126C, 126D and 126E extract data from the transmission queues 125A, 125B, 125C, 125D and 125E, respectively, and output the extracted data to at least one of the wireless signal processing units 130, 140 and 150 via the data collision management unit 127. Then, a wireless signal including the data is transmitted by a wireless signal processing unit (an STA function) in which a transmission right is acquired by CSMA/CA.

The CSMA/CA execution unit 126A executes CSMA/CA on the LL data retained in the transmission queue 125 A. The CSMA/CA execution unit 126B executes CSMA/CA on the VO data retained in the transmission queue 125B. The CSMA-CHA execution unit 126C executes CSMA/CA on the VI data retained in the transmission queue 125C. The CSMA/CA execution unit 126D executes CSMA/CA on the BE data retained in the transmission queue 125D. The CSMA/CA execution unit 126E executes CSMA/CA on the BK data retained in the transmission queue 125E.

The access parameters are assigned such that transmission of wireless signals prioritized in the order of LL, VO, VI, BE, and BK, for example. The access parameters include, for example, CWmin, CWmax, AIFS, and TXOPLimit. CWmin and CWmax indicate a minimum value and a maximum value of the contention window which is a time for which transmission is awaited to avoid collision, respectively. An arbitration inter frame space (AIFS) indicates a fixed transmission waiting time set for each access category to perform collision avoidance control including a priority control function. TXOPLimit indicates the upper limit value of transmission opportunity (TXOP) corresponding to a channel-occupying time. For example, the transmission queue 125 can obtain a transmission right more easily as CWmin and CWmax are shorter. The smaller the AIFS is, the higher the priority of the transmission queue 125 is. The larger the value of TXOPLimit is, the larger the amount of data transmitted with a one-time transmission right.

When the plurality of CSMA/CA execution units 126 obtains the transmission rights with the same STA function, the data collision management unit 127 prevents data collision. Specifically, the data collision management unit 127 adjusts transmission timings of data in which the transmission right is obtained with the same STA function and different categories and transmits the data of the category with higher priority to the STA function. For example, the STA function obtaining the transmission right by CSMA/CA of the transmission queue 125A of LL is the same as the STA function obtaining the transmission right by CSMA/CA of one of the other transmission queues 125B to 125E in some cases. In this case, the data collision management unit 127 preferentially transmits the data stored in the transmission queue 125A to the STA function. In combinations of the other transmission queues 125, the data are transmitted similarly in order which is based on the priority set in the categories. Thus, collision of data for which transmission is allocated to the same STA function is prevented.

In the embodiment, the aspect in which the link management unit implements the channel access function has been described, but each STA function may implement the channel access function. When the link management unit implements the channel access function, each STA function detects a state (idle/busy) of a wireless channel in a corresponding link, and the link management unit determines whether to transmit data (for example, which link is used for transmission). On the other hand, when each STA function implements a channel access function, each STA function may independently execute carrier sensing to transmit data. At this time, channel access in a case in which a plurality of links are simultaneously used may be performed by exchanging the access parameters between the plurality of STA functions and using the access parameters in common, or may be performed by using the access parameters in common by the link management unit. The base station 10 and the terminal apparatus 20 can simultaneously use a plurality of links by transmitting data on the basis of the access parameters common between the plurality of STA functions.

<1-5> Link Management Information 121

FIG. 9 illustrates an example of the link management information 121 in the wireless system 1 according to the embodiment. Since the link management information 221 of the terminal apparatus 20 has information similar to the link management information 121 of the base station 10, description thereof will be omitted. As illustrated in FIG. 9, the link management information 121 includes, for example, information regarding the STA functions, frequency bands, channel IDs, link destination IDs, multi-links, and TID.

In this example, "STA1" corresponds to an STA function that uses the 6 GHz frequency band, that is, the wireless signal processing unit 150 or 250. "STA2" corresponds to an STA function that uses the 5 GHz frequency band, that is, the wireless signal processing unit 140 or 240. "STA3" corresponds to an STA function that uses the 2.4 GHz frequency band, that is, the wireless signal processing unit 130 or 230. Hereinafter, STA1, STA2 and STA3 are also referred to as link #1, link #2 and link #3, respectively.

The channel ID corresponds to an identifier of a channel used in a set frequency band. The link destination ID corresponds to an identifier of the terminal apparatus 20 in the link management information 121 and corresponds to an identifier of the base station 10 in the link management information 221. In this example, multi-links using STA1, STA2 and STA3 are established. When the multi-links are established, the link management units 120 and 220 each transmit data input from a higher layer using the link of at least one STA function associated with the multi-links.

The base station 10 sets one STA function among the plurality of STA functions as an anchor link. In this example, STA1 is set as the anchor link. The anchor link is set by the link management unit 120 of the base station 10. The anchor link transmits and receives control information regarding an operation of the multi-links in addition to the transmission and reception of the assigned data. Combinations of links forming the multi-links may differ between the plurality of terminal apparatuses 20, each of which establishing the multi-links with the base station 10.

"TID" in the link management information 121 indicates association between the STA function and the TID information. Each STA function transmits and receives data corresponding to the assigned TID information. For example, each of TID #1 to #4 correspond to one of LL, VO, VI, BE, and BK. One STA function or a plurality of STA functions may be associated with one type of traffic, that is, one piece of TID information In this example, TID #1 is assigned to both STA1 and STA2. TID #2 is assigned to STA1. TID #3 is assigned to STA2. TID #4 is assigned to STA3.

A traffic flow corresponding to such association between the traffic and the STA functions is preset when the multi-links between the base station 10 and the terminal apparatus 20 are set up. For example, the link management unit 220 of the terminal apparatus 20 determines the association between the traffic and the STA functions, and sends a request to the link management unit 120 of the base station 10. Then, the base station 10 confirms the association between the traffic and the STA functions by sending a response to the request.

The traffic is set to be equal among the plurality of links forming the multi-links, for example. The present invention is not limited thereto and similar types of traffic (priority/non-priority or the like) may be collected in one link constituting the multi-links. As the association between the STA functions and the traffic, there is, for example, association of a sound with the frequency band of 2.4 GHz, and association of a video with 5G. In this way, it is preferable to allocate a frequency used for transmission and reception in accordance with the type of information to be handled and a data capacity.

<2> Operation of Wireless System 1

Hereinafter, examples of various operations related to multi-links in the wireless system 1 according to the embodiment will be described. In the following description, in order to simplify the description, STA1, STA2 and STA3 of the base station 10 are also referred to as "access points AP." Transmission of wireless signals to the access point AP by STA1, STA2, and STA3 of the terminal apparatus 20 corresponds to transmission of wireless signals to STA1, STA2 and STA3 of the base station 10, respectively. When STA1, STA2 and STA3 are individually described, STA1, STA2 and STA3 indicate the STA function of the terminal apparatus 20.

<2-1> Multi-Link Processing

Figure 10:
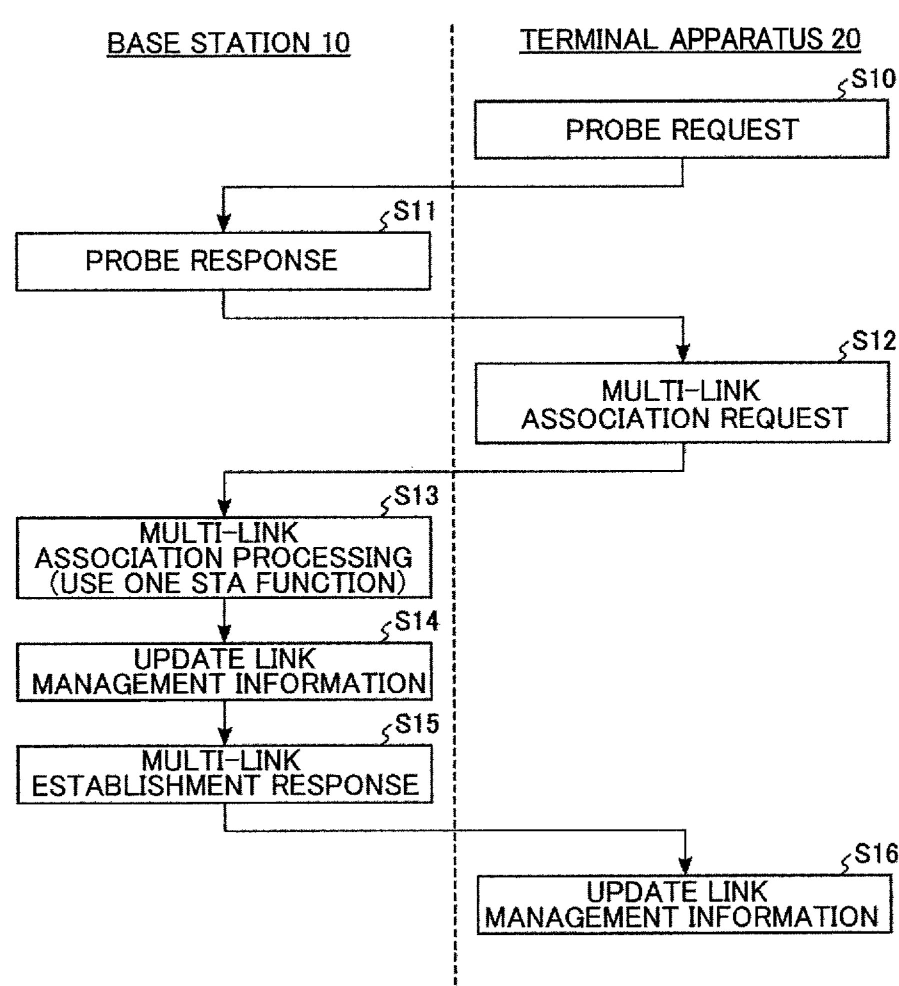
FIG. 10 is a flowchart illustrating an example of multi-link processing in the wireless system according to the embodiment.

FIG. 10 illustrates an example of a flow of the multi-link processing in the wireless system 1 according to the embodiment. As illustrated in FIG. 10, for example, the processing of steps S10 to S16 is executed sequentially in the multi-link processing. Hereinafter, the processing of step S10 and S16 will be described exemplifying a case in which a multi-link is formed using three STA functions.

In the processing of step S10, the terminal apparatus 20 transmits a probe request to the base station 10. The probe request is a signal for checking whether there is the base station 10 in the vicinity of the terminal apparatus 20. The frame control field of the probe request includes, for example, "00/0100 (type value/subtype value)". When the probe request is received, the base station 10 performs the processing of step S11.

In the processing of step S11, the base station 10 transmits a probe response to the terminal apparatus 20. The probe response is a signal used by the base station 10 to respond to a probe request from the terminal apparatus 20. The frame control field of the probe response includes, for example, "00/0101 (type value/subtype value)". When the probe request is received, the terminal apparatus 20 performs the processing of step S12.

In the processing of step S12, the terminal apparatus 20 transmits a multi-link association request to the base station 10 via at least one STA function. The multi-link association request is a signal for requesting the base station 10 to establish a multi-link. For example, the multi-link association request is generated by the link management unit 220 of the terminal apparatus 20. The frame control field of the multi-link association request includes, for example, "00/xxxx (type value/subtype value (xxxx is a predetermined numeric value))." When the multi-link association request is received, the link management unit 120 of the base station 10 performs the processing of step S13.

In the processing of step S13, the link management unit 120 of the base station 10 performs the multi-link association processing in which one STA function is used. Specifically, the base station 10 first performs the association processing of the first STA function with the terminal apparatus 20. Then, when the wireless connection (link) is established in the first STA function, the link management unit 120 of the base station 10 uses the first STA function in which the link is established to perform association processing of a second STA function and association processing of a third STA function. That is, for association processing of an STA function in which no link is established, the STA function in which the link is established is used. When the association processing of at least two STA functions is completed, the base station 10 establishes the multi-link and performs the processing of step S14.

In the processing of step S14, the link management unit 120 of the base station 10 updates the link management information 121. In this example, the processing of step S14 is performed after two links are established, but the link management information 121 may be updated whenever the link state is updated, or may be updated at a time when the multi-link is established. When the multi-link is established and the link management information is updated, the base station 10 performs the processing of step S15.

In the processing of step S15, the base station 10 transmits a multi-link establishment response to the terminal apparatus 20.

The multi-link establishment response is a signal used by the base station 10 to respond to a multi-link request from the terminal apparatus 20. The frame control field of the multi-association request includes, for example, "00/0001 (type value/subtype value)." The link management unit 220 of the terminal apparatus 20 recognizes that the multi-link with the base station 10 is established based on the reception of the multi-link establishment response. When the multi-link establishment response is received, the terminal apparatus 20 performs the processing of step S16.

In the processing of step S16, the link management unit 220 of the terminal apparatus 20 updates the link management information 221. That is, the terminal apparatus 20 records the establishment of the multi-link with the base station 10 in the link management information 221. Thus, the multi-link processing in the wireless system 1 according to the embodiment is complete, and data communication in which the multi-link is used is enabled between the base station 10 and the terminal apparatus 20.

The wireless system 1 according to the embodiment may establish a multi-link when a link is established in the first STA function. In this case, the terminal apparatus 20 receives a beacon signal related to the multi-link from the base station 10 before the multi-link association request in step S12. This operation will be described below with reference to FIGS. 11 and 12.

Figure 11:
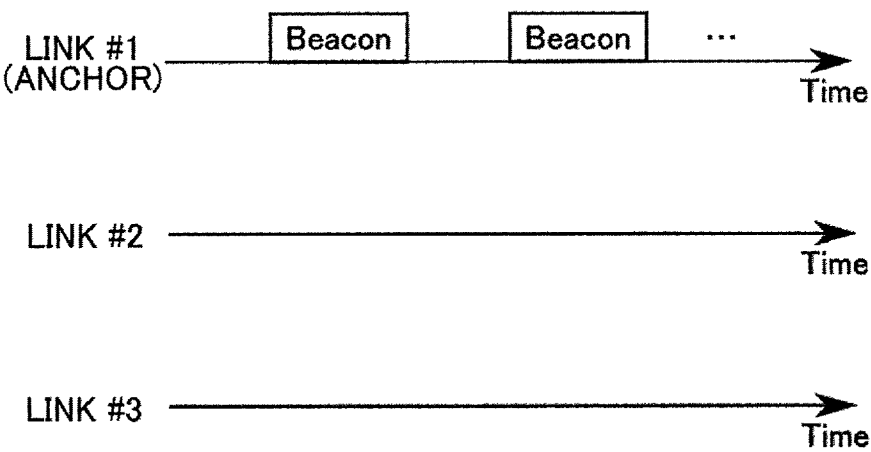
FIG. 11 is a conceptual diagram illustrating an example of a method of outputting a beacon signal in the base station included in the wireless system according to the embodiment.

FIG. 11 illustrates an example of a method of outputting a beacon signal in the base station 10 included in the wireless system 1 according to the embodiment. In this example, of links #1 to #3, link #1 is set as anchor links. As illustrated in FIG. 11, the base station 10 intermittently transmits a beacon signal using link #1 set as the anchor link. Conversely, transmission of a beacon signal by links #2 and #3 which are not set as the anchor links is omitted. The beacon signal may be transmitted using a link that is not set as the anchor link, and may be transmitted using at least the anchor link.

FIG. 12 illustrates a specific example of a beacon signal including multi-link capability information in the wireless system 1 according to the embodiment. As illustrated in FIG. 12, the beacon signal includes, for example, multi-link capability information, operational information of link #1, operational information of link #2, and operational information of link #3. The information is generated by the link management unit 120 of the base station 10.

The multi-link capability information indicates whether the base station 10 enables multi-links. For example, when the multi-link capability information is "0," it indicates that the multi-links are not enabled. When the multi-link capability information is "1," it indicates that multi-links are enabled. The operational information (an operational parameter) of the link indicates a parameter for performing data transmission or the like in the link which can be used as the multi-link. For example, the operational information of link #1 indicates an access parameter or the like of an enhanced distributed channel access (EDCA) for performing transmission control in the link.

When the beacon signal described with reference to FIG. 12 is received, the terminal apparatus 20 checks the multi-link capability information and the operational information of each link which is a multi-link target from the beacon signal. Then, a link management unit 220 of the terminal apparatus 20 notifies the link management unit 120 of the base station 10 of information regarding a link or the like which is a multi-link target at the time of a multi-link association request. Thus, the link management unit 120 of the base station 10 can collectively perform the association of the plurality of links designated by the link management unit 220 of the terminal apparatus 20 and establish the multi-links with the terminal apparatus 20.

When the beacon signal is transmitted only with the above-described anchor link, the beacon signal may not have a field indicating the anchor link. On the other hand, when the beacon signal is transmitted with the anchor link and another link, the beacon signal may have a field indicating the anchor link or a field indicating the other link. Further, the base station 10 may add information included in the above-described beacon signal to the probe response. In this case, the link management unit 220 of the terminal apparatus 20 can transmit a multi-link association request designating a link to be used to the base station 10 without receiving the beacon signal. The base station 10 and the terminal apparatus 20 may perform an authentication process when the multi-links are established.

<2-2> Data Transmission in Multi-Links

Figure 13:
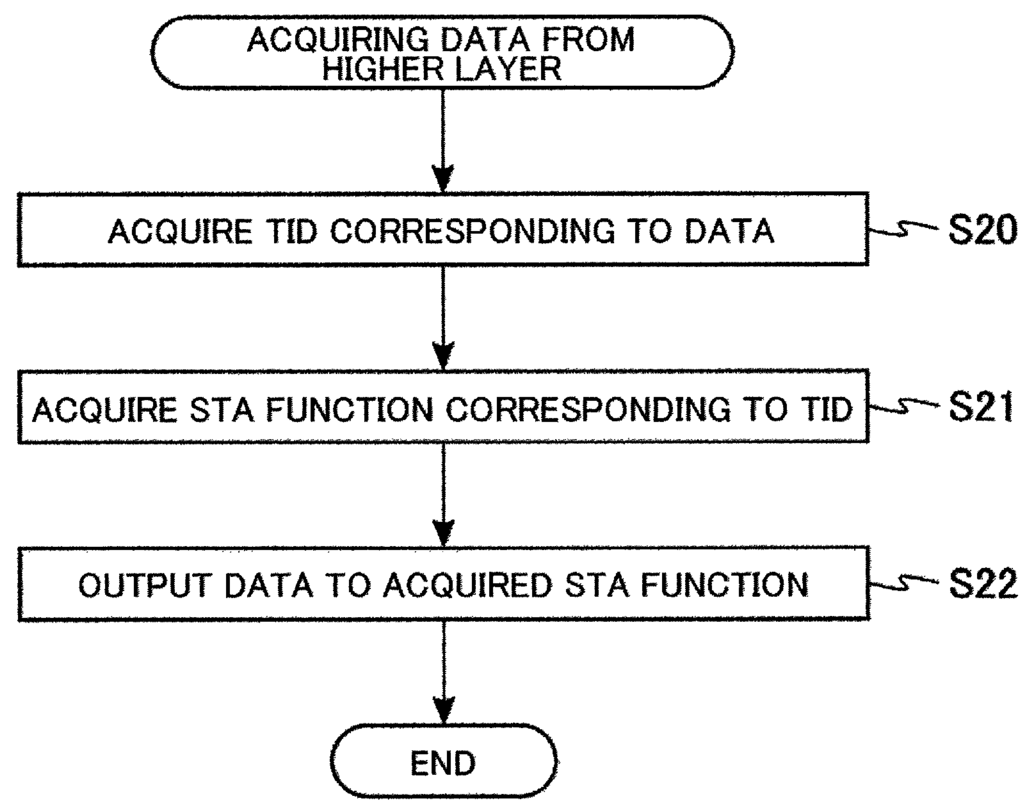
FIG. 13 is a flowchart illustrating an example of a method of transmitting data in multi-links in the wireless system according to the embodiment.

FIG. 13 illustrates an example of a method of transmitting data in multi-links in the base station 10 included in the wireless system 1 according to the embodiment. As illustrated in FIG. 13, the base station 10 sequentially performs processing of steps S20 and S22 when data is acquired from a higher layer. Hereinafter, the processing of steps S20 to S22 will be described.

In the processing of step S20, the link management unit 120 acquires the TID information corresponding to the data. In other words, the link management unit 120 associates the data with the TID with reference to, for example, control information such as a header added to the data acquired from the higher layer.

In the processing of step S21, the link management unit 120 acquires an STA function corresponding to the checked TID information. At this time, the link management unit 120 checks the association between the TID information and the STA function with reference to the link management information 121. In the processing of step S21, the number of STA functions acquired by the link management unit 120 may be singular or plural.

In the processing of step S22, the link management unit 120 transmits the data to the acquired STA function. When one STA function is associated with the data (traffic) to be output, the data is transmitted in series using one STA function. On the other hand, when a plurality of STA functions are associated with the traffic, the data is transmitted in parallel using the plurality of STA functions.

When one type of traffic is transmitted in parallel, the data is distributed and sorted between the link management unit 120 of the base station 10 and the link management unit 220 of the terminal apparatus 20. The distribution of the data is performed by the link management unit of a transmission aide and the sorting of the data is performed by the link management unit of a reception side. For example, the link management unit of the transmitting side adds an identification number and a flag indicating a multi-link to the wireless frame. The link management unit of the reception side performs the sorting of the data based on the added flag and identification number.

In the wireless system 1 according to the embodiment, when a plurality pieces of data is received from the higher layer, the link management unit may perform aggregation by combining the plurality pieces of received data. The aggregation in the multi-links may be used as an option function of which execution or non-execution can be selected by a user.

<2-3> Multi-Link Power Saving

In the wireless system 1 according to the embodiment, a plurality of STA functions are prepared in each function. Examples of the operation modes of the STA function include an active mode, an intermittent operation mode, and an operation pause mode. The active mode corresponds to a state in which the STA function of the terminal apparatus 20 can transmit and receive a wireless signal at any time by maintaining an awake state. The intermittent operation mode corresponds to a state in which the STA function of the terminal apparatus 20 operates intermittently by repeating the awake state and a dozing state. The operation pause mode corresponds to a state in which the STA function of the terminal apparatus 20 cannot transmit and receive a wireless signal by maintaining the dozing state.

In the present specification, the "awake state" corresponds to a state in which a wireless signal can be transmitted and received. The dozing estate corresponds to a state in which a wireless signal cannot be transmitted and received. In the "dozing state," supply of power to a circuit related to the STA function is appropriately interrupted. Therefore, power consumption of the STA function is smaller in the order of the active mode, the intermittent operation mode, and the operation pause mode. The base station 10 or the terminal apparatus 20 can be used for communication, but there can be a link which is not included in a link set of the multi-links between the base station 10 and the terminal apparatus 20 (a disabled link). Hereinafter, in order to simplify the description, a link in the active mode or the intermittent operation mode, that is, a communicable link, is referred to as an "STA function (link) in the awake state." The link in the operation pause mode, that is, the link in the power-saving state in which communication is disabled, is referred to as an "STA function (link) in the dozing state."

In the multi-links in the wireless system 1 according to the embodiment, the anchor link is set to, for example, either the active mode or the intermittent operation mode. On the other hand, links other than the anchor link are set to any one of the active mode, the intermittent operation mode, and the operation pause mode. For example, the terminal apparatus 20 can operate in a power saving state by setting the links other than the anchor link to the operation pause mode in the multi-links.

The state of the multi-link state in which the anchor link is set to the intermittent operation mode and the links other than the anchor link are set to the operation pause mode is referred to as "multi-link power saving" below. When the beacon signal is received in the links other than the anchor link in addition to the anchor link in the multi-link power saving, the links are set to the active mode or the intermittent operation mode.

FIG. 14 illustrates an example of a change in the link management information 121 when the multi-link power saving in the wireless system 1 according to the embodiment is applied. The upper and lower tables in FIG. 14 correspond to non-application and application of the multi-link power saving, respectively. As illustrated in FIG. 14, the link management information 121 further includes operation mode information.

As illustrated on the upper side of FIG. 14, when the multi-link power saving is not applied, for example, the respective operation modes of STA1, STA2 and STA3 are set to the active mode. Other parameters of the link management information 121 in the non-application of the multi-link power saving in this example are the same as those of the link management information 121 illustrated in FIG. 9.

As illustrated on the lower side of FIG. 14, when multi-link power saving is applied, for example, the operation modes of STA1, STA2 and STA3 are set to the intermittent operation mode, the operation pause mode, and the operation pause mode, respectively. Other parameters of the link management information 121 in the application of the multi-link power saving are the same as those in the non-application of the multi-link power saving.

ON/OFF of the multi-link power saving is applied with a dozing transition notification signal ("disable") and an awake transition request signal ("enable"). For example, when the terminal apparatus 20 transmits the dozing transition notification signal to the base station 10 after the setting of the multi-links, the terminal apparatus 20 is set to the multi-link power saving. When the base station 10 transmits the awake transition request signal to the terminal apparatus 20 with the terminal apparatus 20 set to the multi-link power saving, the setting of the multi-link power saving of the terminal apparatus 20 is cancelled.

The awake transition request signal and the dozing transition notification signal may be transmitted from either the base station 10 or the terminal apparatus 20. The transmission of the awake transition request signal is performed using the anchor link or other activated links. The transmission of the dozing transition notification signal is performed by using the anchor link or a link which is stopped (a link transitioning to the operation pause mode). The multi-link power saving may be applied when the multi-links are established. In the multi-link power saving, power may be saved more, compared to a case in which at least the multi-link power saving is not applied. For example, in the multi-link power saving, the anchor link may be set to the active mode and the other links may be set to the operation pause mode.

(Operation of Base Station 10 in Multi-Link Power Saving)

Figure 15:
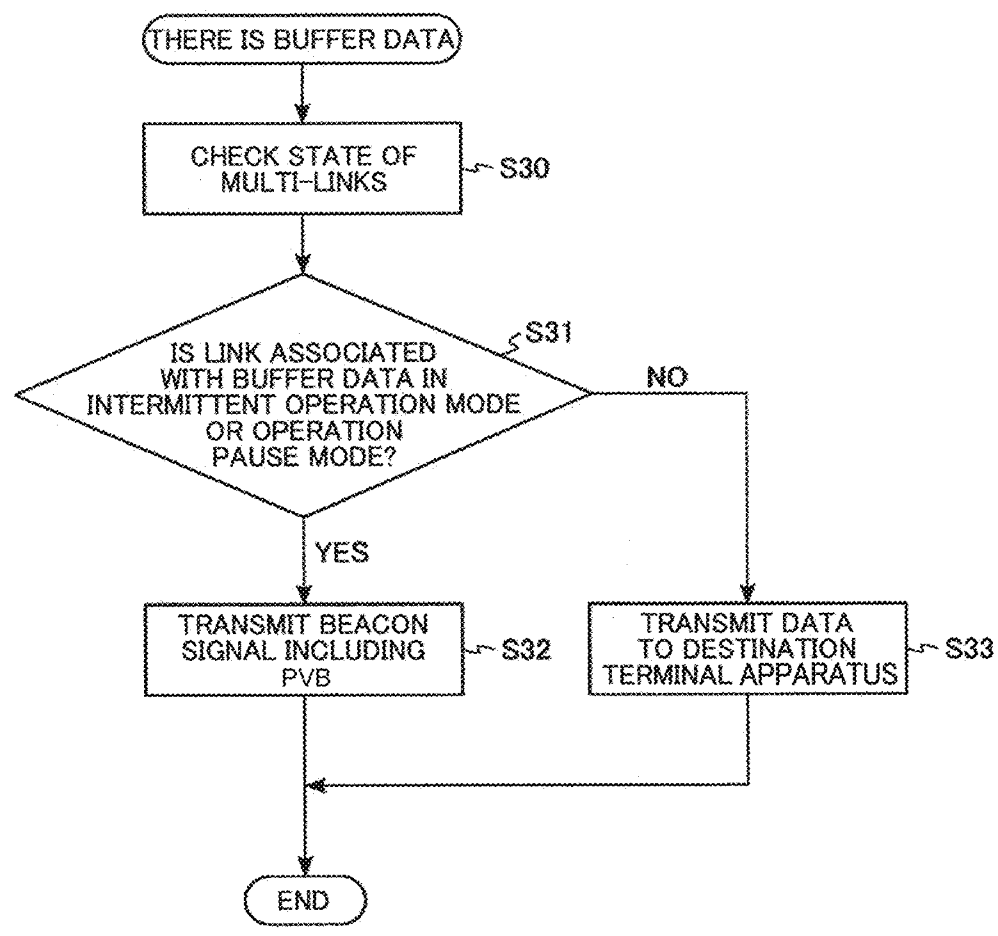
FIG. 15 is a flowchart illustrating an example of an operation in multi-links of the base station included in the wireless system according to the embodiment.

FIG. 15 illustrates an example of an operation in the multi-links of the base station 10 included in the wireless system 1 according to the embodiment. As illustrated in FIG. 15, the link management unit 120 of the base station 10 checks a state of the multi-links when there is buffer data (step S30). The buffer data is data received by the base station 10 via the network NW, and is, for example, data accumulated in the transmission queue 125. The link management unit 120 of the base station 10 checks whether the link associated with the buffer data is in the intermittent operation mode or the operation pause mode (step S31).

When the link associated with the buffer data is in the intermittent operation mode or the operation pause mode (YES in step S31), the link management unit 120 of the base station 10 transmits a beacon signal including a partial virtual bitmap (PVB) of each TID to the terminal apparatus 20 (step S32). The beacon signal may be generated by the link management unit 120 or the STA function of the anchor link. When the link associated with the buffer data is not in the intermittent operation mode or the operation pause mode (NO in steps S31), the link management unit 120 of the base station 10 transmits the data to the destination terminal apparatus 20 (step S33).

Figure 16:
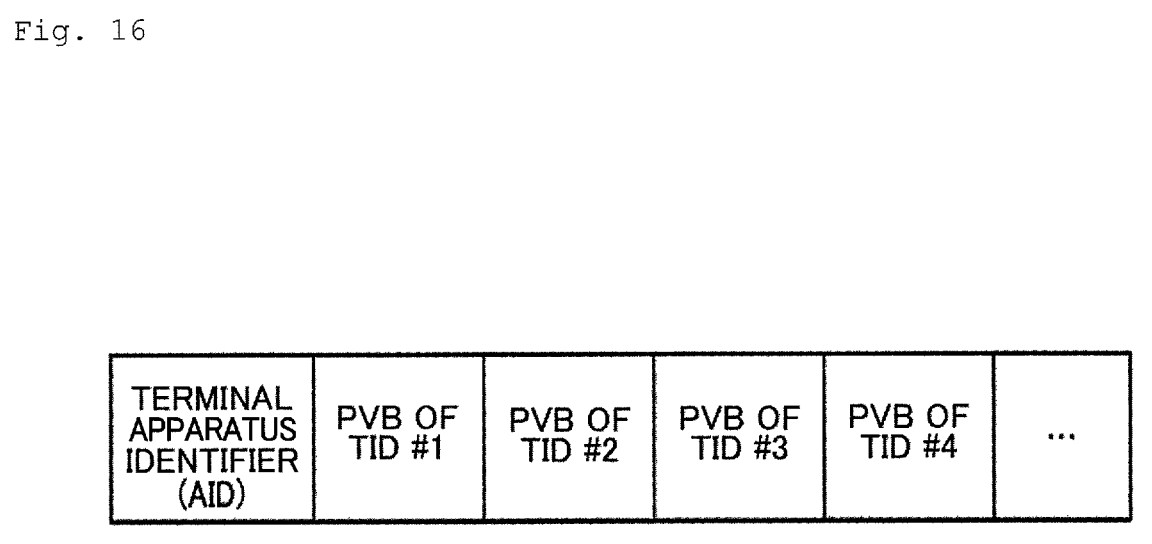

FIG. 16 illustrates a specific example of the beacon signal including the PVB in the wireless system 1 according to the embodiment. As illustrated in FIG. 16, the beacon signal includes, for example, a terminal apparatus identifier and PVBs of a plurality of TIDs.

The terminal apparatus identifier includes, for example, an association identifier (AID) between the base station 10 and the terminal apparatus 20. The PVBs of the plurality of TIDs include, for example, a PVB of TID #1, a PVB of TID #2, a PVB of TID #3, and a PVB of TID #4. For example, when the PVB of TID #1 "0," it indicates that the traffic of the TID #1 is not accumulated. When the PVB of TID #1 "1," it indicates that the traffic of the TID #1 is accumulated. A combination of a bit assigned to the PVB and the accumulation or non-accumulation of the traffic can be freely changed. The number of PVBs of the plurality of TIDs included in the beacon signal can be changed based on the number of set TIDs.

(Operation of Terminal Apparatus 20 in Multi-Link Power Saving)

Figure 17:
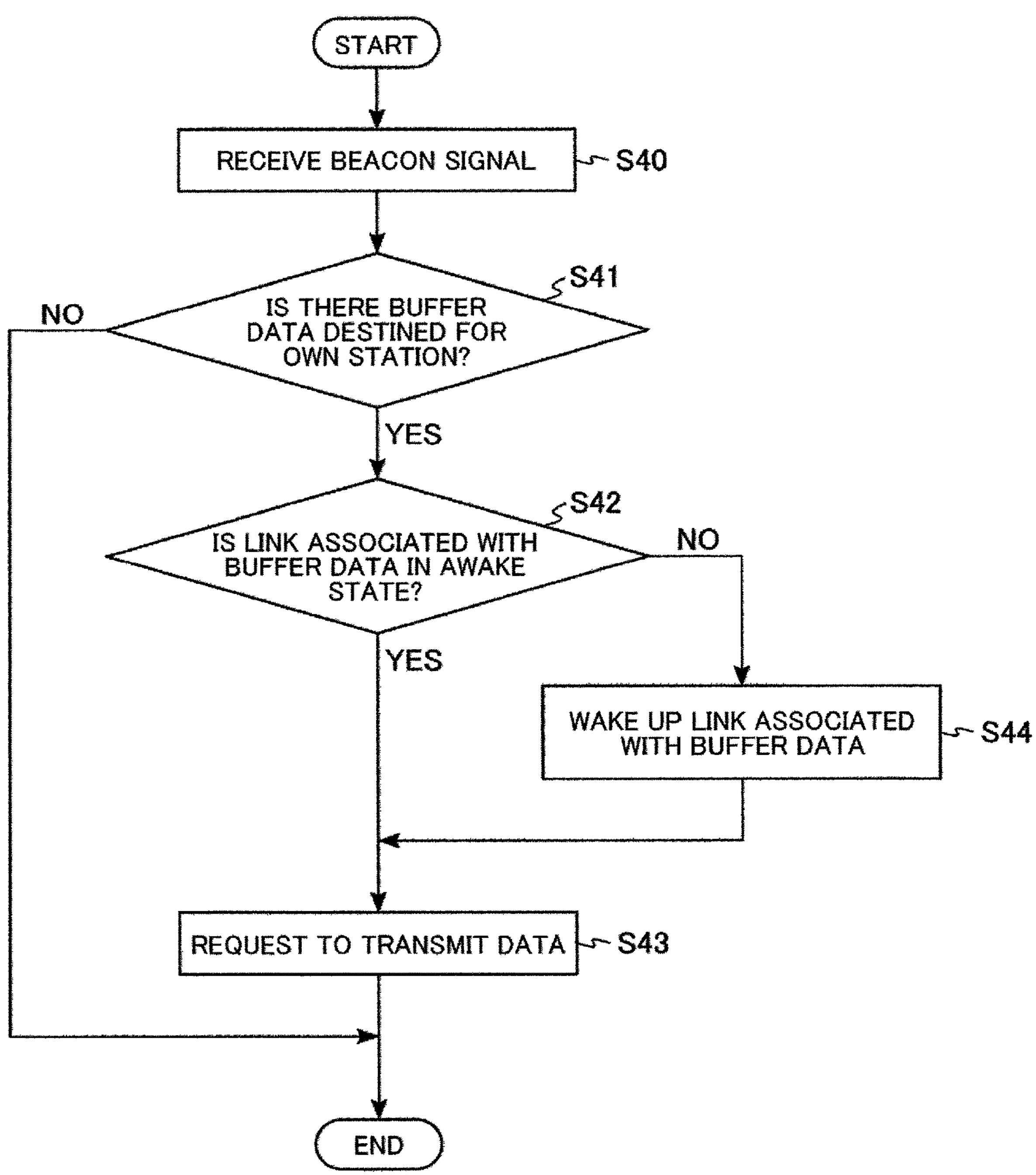
FIG. 17 is a flowchart illustrating an example of an operation during multi-link power saving of a terminal apparatus included in the wireless system according to the embodiment.

FIG. 17 illustrates an example of an operation in the multi-link power saving of the terminal apparatus 20 included in the wireless system 1 according to the embodiment. As illustrated in FIG. 17, in the multi-link power saving, for example, the anchor link of the terminal apparatus 20 which is in the intermittent operation mode receives a beacon signal (step S40). The link management unit 220 of the terminal apparatus 20 checks the PVB of each TID and the AID included in the beacon signal and checks whether there is buffer data destined for the own station (step S41).

When there is no buffer data destined for the own station (NO in step S41), the terminal apparatus 20 ends the operation. When there is the buffer data destined for the own station (YES in step S41), the link management unit 220 of the terminal apparatus 20 checks whether the link associated with the buffer data is in the awake state, that is, the active mode or the intermittent operation mode (step S42).

When the link associated with the buffer data is in the awake state (YES in step S42), the link management unit 220 of the terminal apparatus 20 requests the base station 10 to transmit data (step S43). When the link associated with the buffer data is not in the awake state (NO in step S42), the link management unit 220 of the terminal apparatus 20 first wakes up the link associated with the buffer data, that is, causes the link to transition from the dozing state to the awake state. Thereafter, the link management unit 220 of the terminal apparatus 20 requests the base station 10 to transmit data (step S43).

The terminal apparatus 20 perform the above-described operation whenever the anchor link receives the beacon signal. The link management unit 220 of the terminal apparatus 20 causse the link to transition to the dozing state again when the buffer data destined for the waked link is lost. A timing at which the link management unit 220 of the terminal apparatus 20 causes the waked link to transition to the dozing state can be set to any timing. For example, the timing at which the link management unit 220 of the terminal apparatus 20 causes the waked link to transition to the dozing state may be a timing at which the buffer data destined for the link is lost or a timing at which a predetermined time has passed after the buffer data destined for the link is lost.

(Specific Example of Operation of Starting Multi-Link Power Saving)

Figure 18:
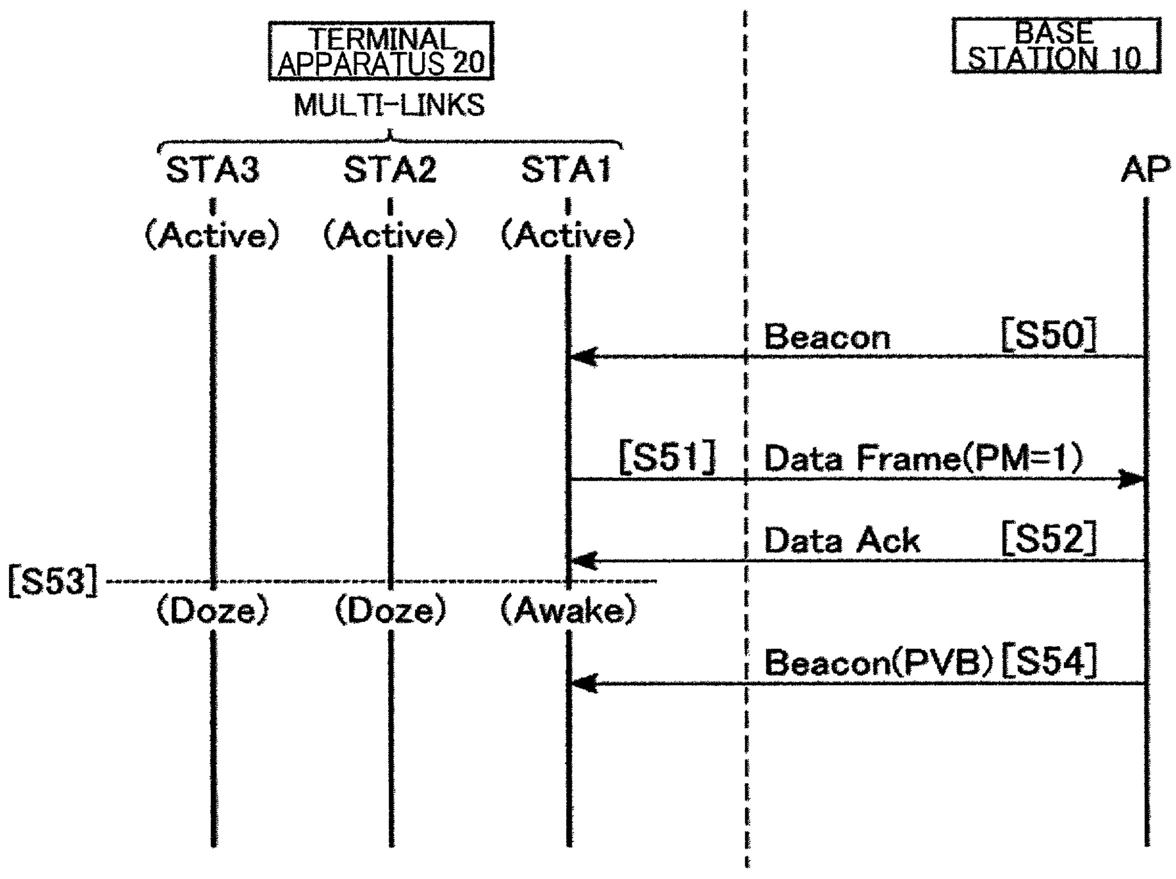
FIG. 18 is a flowchart illustrating an example of an operation of starting multi-link power saving in the wireless system according to the embodiment.

FIG. 18 illustrates an example of a flow of an operation of starting the multi-link power saving in the wireless system 1 according to the embodiment. As illustrated in FIG. 18, each of STA1, STA2, and STA3 is in the active state when this operation is started. The access point AP transmits a beacon signal to STA1 of the terminal apparatus 20, that is, the anchor link (step S50). The beacon signal includes, for example, information indicating that traffic of each of STA1, STA2 and STA3 is empty.

STA1 of the terminal apparatus 20 transmits a wireless signal for notifying the start of multi-link power saving to the access point AP in response to, for example, the traffic which is empty (step S51). A data frame of the wireless signal for notifying the start of the multi-link power saving includes a power management (PM) bit in which, for example, "1" is stored. The access point AP receiving the signal of "PM=1" transmits, to STA1 of the terminal apparatus 20, a wireless signal (Data ACK) for notifying the terminal apparatus 20 that the signal is received (step S52).

When STA1 of the terminal apparatus 20 receives Data ACK in response to the transmission of the data frame including "PM=1" by STA1 of the terminal apparatus 20, the link management unit 220 of the terminal apparatus 20 causes STA1 (the anchor link) to transition to the intermittent operation mode (the awake state) and causes STA2 and STA3 to transition to the operation pause mode (the dozing state) (step S53). Thus, total power consumption of STA1, STA2 and STA3 forming the multi-links is lower than that before the multi-link power saving is used. In the processing of step S53, there may be at least one STA function set in the dozing state among the plurality of STA functions forming the multi-links.

After Data ACK is transmitted as a response to the reception of "PM=1", the access point AP transmits a beacon signal including the PVB to STA1 (the anchor link) of the terminal apparatus 20 (step S54). At this time, STA1 in the awake state can receive the beacon signal. On the other hand, STA2 and STA3 in the dozing state do not receive the beacon signal, and maintain a state of power consumption lower than that of STA1.

As described above, the terminal apparatus 20 in the wireless system 1 according to the embodiment causes the link to transition to the multi-link power saving in accordance with a traffic state, and reduces the power consumption of the multi-links. The base station 10 intermittently transmits the beacon signal including the PVB for notifying a buffer status of data by using the anchor link which is in the awake state based on the transition of the terminal apparatus 20 to the multi-link power saving. The details of the communication method between the base station 10 and the terminal apparatus 20 during the multi-link power saving will be described below.

(Specific Example of Operation of Ending Multi-Link Power Saving)

Figure 19:
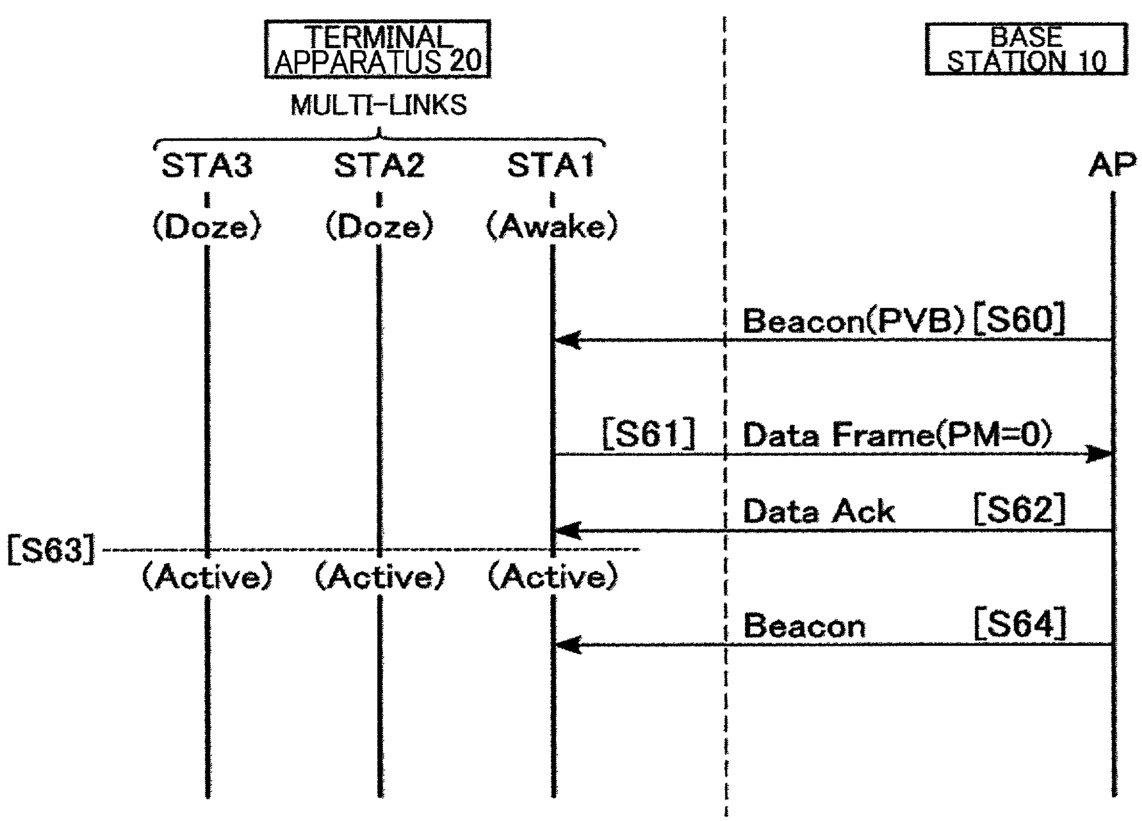
FIG. 19 is a flowchart illustrating an example of an operation of ending the multi-link power saving in the wireless system according to the embodiment.

FIG. 19 illustrates an example of a flow of an operation of ending the multi-link power saving in the wireless system 1 according to the embodiment. As illustrated in FIG. 19, when this operation is started, STA1 is in the awake state and STA2 and STA3 are in the dozing state. The access point AP transmits a beacon signal to STA1 of the terminal apparatus 20, that is, the anchor link (step S60). The beacon signal includes, for example, information for requesting the terminal apparatus 20 to end the multi-link power saving.

STA1 of the terminal apparatus 20 transmits a wireless signal for notifying the end of the multi-link power saving to the access point AP in response to the reception of the beacon signal (step S61). A data frame of the wireless signal for notifying the end of the multi-link power saving includes a PM bit in which, for example, "0" is stored. The access point AP receiving the signal of "PM=0" transmits, to STA1 of the terminal apparatus 20, a wireless signal (Data ACK) for notifying the terminal apparatus 20 that the signal is received (step S62).

When STA1 of the terminal apparatus 20 receives Data ACK in response to the transmission of the data frame including "PM=0," the link management unit 220 of the terminal apparatus 20 causes STA1 to transition from the intermittent operation mode (the awake state) to the active mode and causes STA2 and STA3 to transition from the operation pause mode (the dozing state) to the active mode (step S53). Thus, each of STA1, STA2, and STA3 forming the multi-links enters a state in which a wireless signal can be received from the base station 10.

After Data ACK is transmitted in response to the reception of "PM=0," the access point AP transmits a beacon signal to STA1 (the anchor link) of the terminal apparatus 20 (step S54). The beacon signal includes various information elements necessary in communication.

As described above, the base station 10 in the wireless system 1 according to the embodiment can cause the STA function set to the intermittent operation mode or the operation pause mode in the multi-links to transition to the active mode, and can set the plurality of STA functions forming the multi-links to a communicable state. In the above description, the case where the multi-link power saving is ended based on the beacon signal of the base station 10 has been exemplified, but the present invention is not limited thereto. For example, the link management unit 220 of the terminal apparatus 20 may notify the link management unit 120 of the base station 10 that the multi-link power saving is ended based on a user manipulation or application control.

(Specific Example of Operation During Multi-Link Power Saving)

Figure 20:
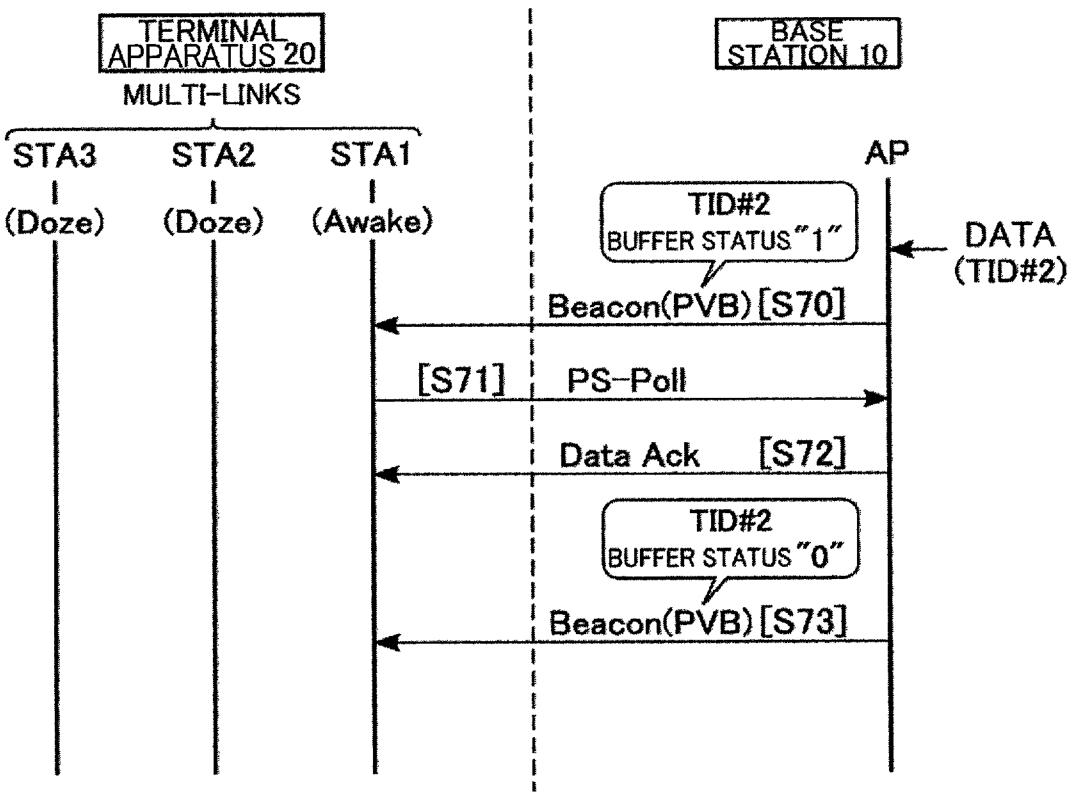
FIG. 20 is a flowchart illustrating an example of a communication method during the multi-link power saving in the wireless system according to the embodiment.
Figure 21:
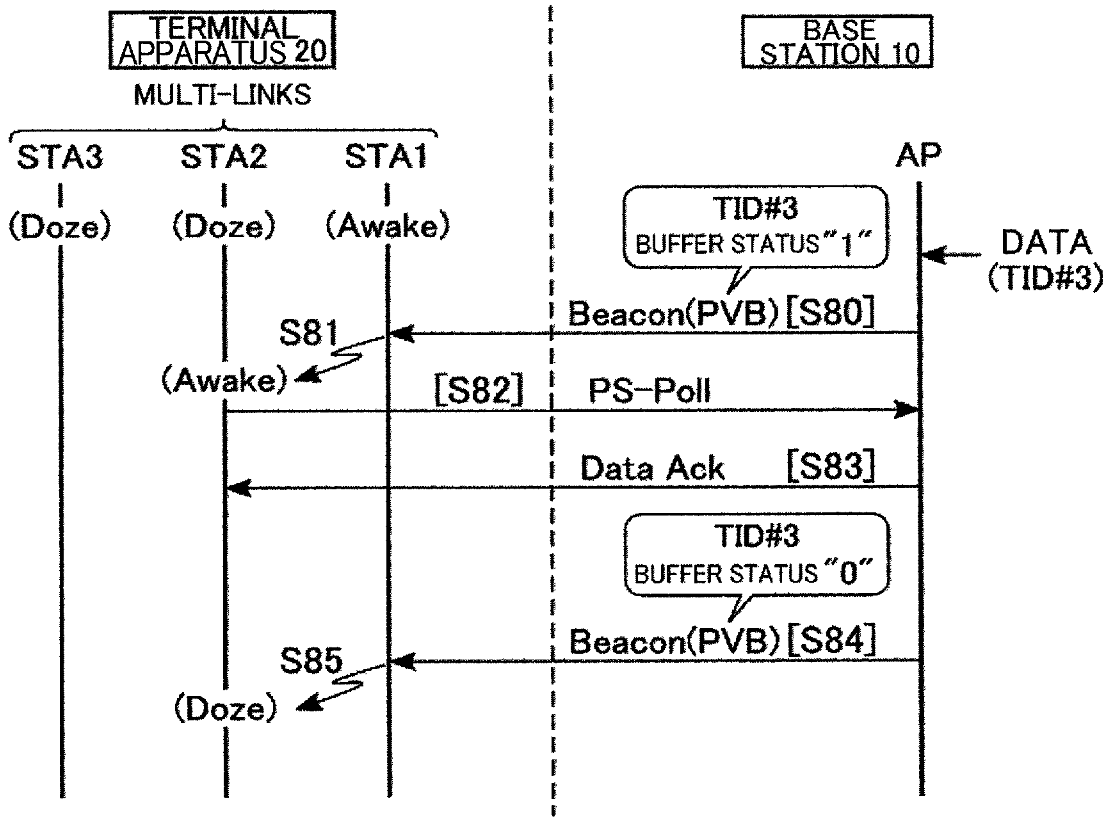
FIG. 21 is a flowchart illustrating an example of a communication method during multi-link power saving in the wireless system according to the embodiment.

FIGS. 20 and 21 illustrate examples of a flow of operations during the multi-link power saving in the wireless system 1 according to the embodiment. FIG. 20 corresponds to an operation when the access point AP receives data of TID #2. FIG. 21 corresponds to an operation when the access point AP receives data of TID. #3. The TID assigned to each link in this example is the same as the link management information 121 described with reference to FIG. 14.

An operation in a case in which the access point AP receives the data of TID #2 assigned to STA1 (the anchor link) during the multi-link power saving will be first described with reference to FIG. 20. As illustrated in FIG. 21, when the access point AP receives the data of TID #2 from the network NW, the access point AP accumulates, for example, the data in the transmission queue 125 of the link management unit 120. Then, the access point AP transmits a beacon signal including a PVB indicating that the buffer status of the data of the TID #2 is "1" to STA1 (step S70).

The beacon signal received by STA1 of the terminal apparatus 20 is transmitted to the link management unit 220. Then, the link management unit 220 checks whether there is the buffer data of each TID with reference to the beacon signal. Here, the link management unit 220 checks that the data of TID #2 is buffered and STA1 associated with the data of the TID #2 is in the awake state. Based on the checking result, the link management unit 220 transmits a power save-poll (PS-Poll) frame for giving a request for transmitting data to the access point AP via STA1 (step S71).

When the PS-Poll frame is received from STA1 of the terminal apparatus 20, the access point AP transmits Data ACK including the data of the TID #2 to STA1 of the terminal apparatus 20 (step S72). Thus, STA1 of the terminal apparatus 20 can receive the data dedicated for the own station accumulated in the access point AP.

When the transmission of the data of TID #2 is completed and the accumulation of the data of TID #2 in the transmission queue 125 is canceled, the access point AP transmits a beacon signal including the PVB indicating that the buffer status of the data of TID #2 is "0" to STA1 of the terminal apparatus 20 (step S73). That is, the access point AP notifies the link management unit 220 of the terminal apparatus 20 that the transmission of the data of TID #2 is completed via STA1.

Next, an operation in a case in which the access point AP receives the data of TID #3 assigned to STA2 during the multi-link power saving will be described with reference to FIG. 21. As illustrated in FIG. 21, when the access point AP receives the data of TID #3 from the network NW, the access point AP stores the data in the transmission queue 125 of the link management unit 120, for example. Then, the access point AP transmits a beacon signal including a PVB indicating that the buffer status of the data of TID #3 is the “1” to STA1 (step S80).

The beacon signal received by STA1 of the terminal apparatus 20 is transmitted to the link management unit 220. Then, the link management unit 220 checks whether there is the buffer data of each TID with reference to the beacon signal. Here, the link management unit 220 checks that the data of TID #3 is buffered and that STA2 with which the data of TID #3 is associated is in the dozing state. Based on the checking result, the link management unit 220 causes STA2 to transition to a wake-up state, that is, from the dozing state to the awake state (step S81).

Thereafter, the link management unit 220 transmits a power save-poll (PS-Poll) frame for giving a request for transmitting the data of TID #3 to the access point AP via STA2 (step S82). When the PS-Poll frame is received from STA2 of the terminal apparatus 20, the access point AP transmits Data ACK including the data of the TID #3 to STA2 of the terminal apparatus 20 (step S83). Thus, STA2 of the terminal apparatus 20 can receive the data dedicated for the own station accumulated in the access point AP.

When the transmission of the data of TID #3 is completed and the accumulation of the data of TID #3 in the transmission queue 125 is canceled, the access point AP transmits a beacon signal including the PVB indicating that the buffer status of the data of TID #3 is “0” to STA1 of the terminal apparatus 20 (step S84). That is, the access point AP notifies the link management unit 220 of the terminal apparatus 20 that the transmission of the data of TID #3 is completed via STA1. The beacon signal may be received by STA2.

Then, the link management unit 220 causes STA2 to transition from the awake state to the dozing state based on the received beacon signal (step S85). That is, during the multi-link power saving, the links other than the anchor links among the plurality of links forming the multi-links are set again to the dozing state based on the completion of the transmission of the data.

As described above, the base station 10 in the wireless system 1 according to the embodiment can transmit the data to the terminal apparatus 20 using the multi-link power saving. In the above description, the case in which the base station 10 receives the data of the TIDs assigned to STA2 during the multi-link power saving has been described, but the present invention is not limited thereto. STA3 can also cause the link to transition from the dozing state to the wake-up state and receive the data, similarly to STA2.

The cases in which the data is transmitted for each STA function have been exemplified, but the data may be transmitted in parallel to the plurality of STA functions forming the multi-links. For example, when the buffer status of each of STA1 and STA2 is “1,” the link management unit 220 of the terminal apparatus 20 may instruct each of STA1 and STA2 to transmit the PS-Poll frame to the access point AP. When the TIDs are associated with the plurality of links in the dozing state, the link management unit 220 of the terminal apparatus 20 can wake up the plurality of links. That is, the link management unit 220 of the terminal apparatus 20 can wake up the links in the dozing state and receive the data in accordance with the buffer status of data regardless of the number of links forming the multi-links.

Figure 22:
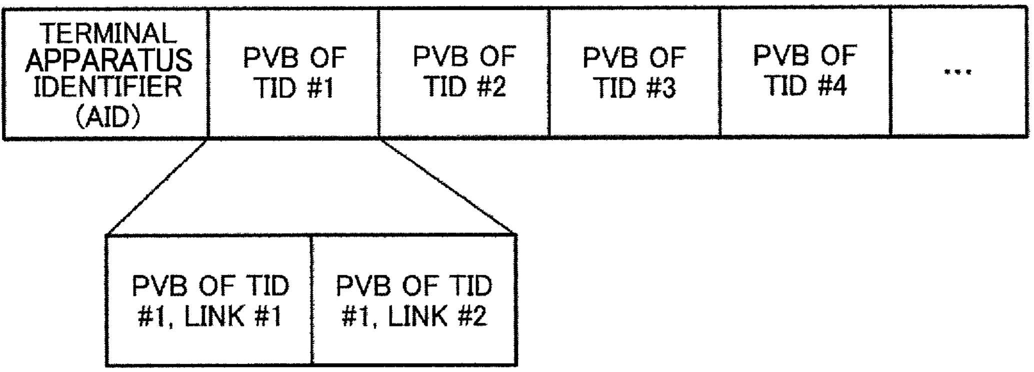
FIG. 22 is a conceptual diagram illustrating an example of a beacon signal including a partial virtual bitmap (PVB) in the wireless system according to the embodiment.

When the TIDs are associated with the plurality of links in the dozing state, the access point AP can wake up some of these links. Therefore, the access point AP designates the links to be waked up in addition to AID and the TID and notifies of buffer information of the data. FIG. 22 illustrates an example of a beacon signal transmitted from the access point AP in this example. As illustrated in FIG. 22, in the PVBs of the TIDs associated with the plurality of links, it may be notified of whether there is the buffer data for each link associated with the TID. For example, the PVB of TID #1 may include the PVB of link #1 associated with TID #1 and the PVB of link #2 associated with TID #1.

<3> Advantageous Effects of Embodiment

In the wireless system 1 according to the embodiment described above, it is possible to reduce the power consumption of the terminal apparatus 20 in the multi-links. Hereinafter, the details of the advantageous effect of the wireless system 1 according to the embodiment will be described.

The base station and the terminal apparatus using a wireless LAN have the plurality of STA functions provided for each band to be used like, for example, 2.4 GHz, 5 GHz, and 6 GHz in some cases. In such as wireless system, for example, wireless connection is established and data communication between the base station and the terminal apparatus is performed by selecting one STA function among the plurality of STA functions. At this time, in the wireless system, unselected STA functions are not used even when there is a base station corresponding to the bands of the STA functions.

In the wireless system 1 according to the embodiment, however, the plurality of STA functions provided in each of the base station 10 and the terminal apparatus 20 are utilized to establish multi-links between the base station 10 and the terminal apparatus 20. In the data communication by the multi-links, the plurality of bands can be used together, and the functions of a wireless LAN device can be sufficiently utilized. As a result, the wireless system 1 according to the embodiment can realize efficient communication and can improve a communication speed. On the other hand, since the plurality of STA functions are used in each of the base station 10 and the terminal apparatus 20, the power consumption of the multi-links is greater than that of a single link.

Therefore, the wireless system 1 according to the embodiment sets the multi-links to the multi-link power saving when traffic is small or the like. In the multi-link power saving, for example, at least one STA function among the plurality of STA functions forming the multi-links is set to a normal state (the awake state), and the other STA functions are set to the power saving state (the dozing state). The STA function in the awake state can receive, for example, a beacon signal of the base station 10. The STA function in the dozing state is stopped, for example, in the same manner as in the Disable state. Therefore, the power consumption of the STA function in the dozing state is less than that of the STA function in the awake state.

In the multi-link power saving, the STA function in the awake state receives a beacon signal including information corresponding to the plurality of STA functions forming the multi-links. For example, when data regarding the STA function in the dozing state is input from the network NW to the base station 10, the base station 10 notifies the terminal apparatus 20 that data is accumulated via the STA function (link) in the awake state. Then, the STA function of the terminal apparatus 20 transmits the notification to the link management unit 220, and the link management unit 220 wakes up the STA function in the dozing state. Thus, the waked STA function can acquire the data from the base station 10 by transmitting a PS-Poll frame.

As described above, the wireless system 1 according to the embodiment can reduce the power consumption of the terminal apparatus 20 by utilizing the multi-link power saving. Then, the link management unit 220 of the terminal apparatus 20 can appropriately wake up the STA function in the dozing state based on the beacon signal received by the STA function in the awake state during the multi-link power saving. Thus, the data communication between the base station 10 and the terminal apparatus 20 can be realized even in the multi-link power saving. As a result, the wireless system 1 according to the embodiment can inhibit latency delay in the multi-link power saving.

<4> Others

In the foregoing embodiment, each STA function may notify the corresponding link management unit when the link cannot be maintained due to movement or the like of the terminal apparatus 20. The link management unit 220 of the terminal apparatus 20 may change the multi-link state with the link management unit 120 of the base station 10 based on a notification from an STA function. Specifically, for example, the link management unit 220 of the terminal apparatus 20 and the link management unit 120 of the base station 10 may appropriately change the STA function used in the multi-link. When the multi-link status is changed, the link management units 120 and 220 update the pieces of link management information 121 and 221, respectively. The link management units 120 and 220 may update the association between the traffic and the STA function with an increase or decrease in the number of links.

The configuration of the wireless system 1 according to the embodiment is merely exemplary, and other configurations may be used. For example, the case in which each of the base station 10 and the terminal apparatus 20 has three STA functions (wireless signal processing units) has been exemplified, but the present invention is not limited thereto. The base station 10 may include at least two wireless signal processing units. Similarly, the terminal apparatus 20 may include at least two wireless signal processing units. The number of channels that can be processed by each STA function can be set appropriately according to the frequency band to be used. Each of the wireless communication modules 14 and 24 may correspond to wireless communication in a plurality of frequency bands by a plurality of communication modules, or may correspond to wireless communication in a plurality of frequency bands by one communication module.

The functional configurations of the base station 10 and the terminal apparatus 20 in the wireless system 1 according to the embodiment are merely exemplary. The functional configuration of the base station 10 and the terminal apparatus 20 may have other names and groupings as long as the operations described in each embodiment can be performed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

In the wireless system 1 according to the embodiment, the CPU included in each of the base station 10 and the terminal apparatus 20 may be another circuit. For example, a micro processing unit (MPU) or the like may be used in place of the CPU. Each of the processing described in each embodiment may be realized using dedicated hardware. The wireless system 1 according to each embodiment may perform both processing executed by software and processing executed by hardware, or may perform only one of them.

In each embodiment, the flowchart used to describe the operations is merely exemplary. Each operation described in the embodiment may be replaced within a range in which the order of processing can be fulfilled, or other processing may be added. The format of the wireless frame described in the foregoing embodiment is merely exemplary. The wireless system 1 may use other formats of wireless frames as long as the operation described in each embodiment can be performed.

The present invention is not limited to the foregoing embodiments, and can be modified in various forms without departing from the gist of the present invention at the implementation stage. The embodiments may be combined appropriately, in which advantageous effects of the combinations can be obtained. Further, the foregoing embodiments include various inventions, and various inventions can be extracted by selecting combinations of the plurality of constituent elements disclosed herein. For example, even if several constituent elements are removed from all the constituent elements described in the embodiments, configurations in which those constituent elements are removed can be extracted as an invention as long as the problem can be solved and the advantageous effects can be obtained.

REFERENCE SIGNS LIST

1 Wireless system
10 Base station
20 Terminal apparatus
30 Server
11, 21 CPU
12, 22 ROM
13, 23 RAM
14, 24 Wireless communication module
15 Wired communication module
25 Display
26 Storage
110, 210 Data processing unit
120, 220 Link management unit
121, 221 Link management information
122, 222 Association processing unit
123, 223 Authentication processing unit
124 Data categorizing unit
125 Transmission queue
126 CSMA/CA execution unit
127 Data collision management unit
130, 140, 150, 230, 240, 250 Wireless signal processing unit

The invention claimed is:

1. A base station configured to communicate with a terminal apparatus, the base station comprising:
- a first wireless signal processing circuit configured to establish a first link with the terminal apparatus;
- a second wireless signal processing circuit configured to establish a second link with the terminal apparatus, the second link differing from the first link; and
- processing circuitry configured to transmit data via a multi-link comprising the first link and the second link, and associate the data with at least one of the first link or the second link based on a type of traffic information of the data, wherein
- if the terminal apparatus is in a state of not being able to receive the data via a link associated with the data, the processing circuitry is further configured to:
  - accumulate the data;
  - transmit a beacon signal to the terminal apparatus using at least one of the first link or the second link, the beacon signal including information designating a predetermined link to be used for acquiring the data, wherein the type of traffic information is associated with both the first link and the second link, and the beacon signal includes information indicating separately for the first link and the second link whether the data corresponding to the type of traffic information is accumulated; and cause either the first wireless signal processing circuit or the second wireless signal processing circuit that operates on the predetermined link to transmit the data.

2. The base station according to claim 1, wherein the beacon signal includes information indicating whether or not a piece of data that is designated to the first link among the data has been accumulated, and information indicating whether or not a piece of data that is designated to the second link among the data has been accumulated.

3. A terminal apparatus configured to communicate with a base station, the terminal apparatus comprising:

a first wireless signal processing circuit configured to establish a first link with the base station;

a second wireless signal processing circuit configured to establish a second link with the base station, the second link differing from the first link; and processing circuitry configured to transmit data via a multi-link comprising the first link and the second link, and associate the data with at least one of the first link or the second link based on a type of traffic information of the data, wherein if the terminal apparatus is in a state of not being able to receive the data via a link associated with the data, the base station accumulates the data, and the processing circuitry is further configured to:

receive a beacon signal using at least one of the first link or the second link, the beacon signal including information designating a predetermined link to be used for acquiring the data, wherein the type of traffic information is associated with both the first link and the second link, and the beacon signal includes information indicating separately for the first link and the second link whether the data corresponding to the type of traffic information is accumulated; and cause either the first wireless signal processing unit or the second wireless signal processing unit that operates on the predetermined link to acquire the data.

4. The terminal apparatus according to claim 3, wherein the beacon signal includes information indicating whether or not a piece of data that is designated to the first link among the data has been accumulated, and information indicating whether or not a piece of data that is designated to the second link among the data has been accumulated.

* * * * *